US012807842B2

(12) United States Patent
Chung et al.

(10) Patent No.: US 12,807,842 B2
(45) Date of Patent: Nov. 24, 2026

(54) BRUSH COMPOSITIONS FOR MAGNETIC FIELD-ASSISTED FINISHING AND RELATED METHODS AND USES THEREOF

(71) Applicant: BOARD OF TRUSTEES OF MICHIGAN STATE UNIVERSITY, East Lansing, MI (US)

(72) Inventors: Haseung Chung, Ann Arbor, MI (US); Patrick Kwon, Okemos, MI (US); Kenneth L. Foster, Brighton, MI (US)

(73) Assignee: BOARD OF TRUSTEES OF MICHIGAN STATE UNIVERSITY, East Lansing, MI (US)

( * ) Notice: Subject to any disclaimer, the term of this patent is extended or adjusted under 35 U.S.C. 154(b) by 811 days.

(21) Appl. No.: 18/024,568

(22) PCT Filed: Sep. 9, 2021

(86) PCT No.: PCT/US2021/049572
§ 371 (c)(1),
(2) Date: Mar. 3, 2023

(87) PCT Pub. No.: WO2022/056067
PCT Pub. Date: Mar. 17, 2022

(65) Prior Publication Data

US 2023/0312979 A1 Oct. 5, 2023

Related U.S. Application Data

(60) Provisional application No. 63/076,482, filed on Sep. 10, 2020.

(51) Int. Cl.
*C09G 1/02* (2006.01)
*H01F 1/44* (2006.01)

(52) U.S. Cl.
CPC ............... *C09G 1/02* (2013.01); *H01F 1/442* (2013.01)

(58) Field of Classification Search
CPC .................................. C09G 1/02; H01F 1/442
See application file for complete search history.

(56) References Cited

U.S. PATENT DOCUMENTS 6,475,404 B1 11/2002 Carlson
6,527,972 B1 3/2003 Fuchs et al.
(Continued)

FOREIGN PATENT DOCUMENTS

IN 1991DE2005 A 7/2007
IN 201611025761 A 2/2016

OTHER PUBLICATIONS

"MKnano hexagonal boron nitride" acquired from https://mknano.com/nanoparticles/carbides-nitrides-and-other-compounds/hexagonal-boron-nitride-nanopowder/.*
(Continued)

*Primary Examiner* — Gerard Higgins
(74) *Attorney, Agent, or Firm* — MARSHALL, GERSTEIN & BORUN LLP

(57) ABSTRACT

The disclosure relates to brush compositions for magnetic field-assisted finishing (MAF). In particular, the disclosure relates to brush compositions for MAF including a carrier fluid, optionally a solid lubricant dispersed in the carrier fluid, abrasive particles dispersed in the carrier fluid, and magnetic particles dispersed in the carrier fluid. The solid lubricant can be in the form of solid lubricant nanoplatelets or other nanoparticles. The disclosure also relates to systems, methods, and uses of the brush composition.

35 Claims, 8 Drawing Sheets

(56) References Cited

U.S. PATENT DOCUMENTS

| | | | | |
|---|---|---|---|---|
| 2007/0210274 | A1* | 9/2007 | Bose | H01F 1/447 252/62.62 |
| 2010/0204072 | A1 | 8/2010 | Kwon et al. | |
| 2014/0020305 | A1 | 1/2014 | Kordonski et al. | |
| 2015/0323524 | A1 | 11/2015 | Alocilja et al. | |
| 2018/0200862 | A1 | 7/2018 | Lu et al. | |

OTHER PUBLICATIONS

Manzoor et al., Two-dimensional rGO-MoS 2-hybrid additives for high-performance magnetorheological fluid, Sci. Rep., 8(1):12672 (Aug. 2018).

Lee et al., "Experimental and statistical study on magnetic field assisted finishing of mold steel using nano-scale solid lubricant and abrasive particles," *Proceedings of the ASME 2018 13th International Manufacturing Science and Engineering Conference* (*MSEC2018*), Jun. 18-22, 2018, College Station, TX.

International Application No. PCT/US21/49572, International Search Report and Written Opinion, mailed Feb. 2, 2022.

* cited by examiner

BRUSH COMPOSITIONS FOR MAGNETIC FIELD-ASSISTED FINISHING AND RELATED METHODS AND USES THEREOF

CROSS REFERENCE TO RELATED APPLICATION

This application is a US national stage of International Application No. PCT/US2021/049572, filed Sep. 9, 2021, which claims priority to U.S. Provisional Application No. 63/076,482 filed on Sep. 10, 2020, each of which is incorporated herein by reference in its entirety.

STATEMENT OF GOVERNMENT INTEREST

None.

BACKGROUND OF THE DISCLOSURE

Field of the Disclosure

The disclosure relates to a brush composition for magnetic field-assisted finishing. The brush composition includes a carrier fluid, optionally a solid lubricant dispersed in the carrier fluid, abrasive particles dispersed in the carrier fluid, and magnetic particles dispersed in the carrier fluid. The disclosure also relates to methods of finishing a workpiece, as well as syringe delivery systems and systems for magnetic field-assisted finishing using the brush compositions of the disclosure.

Brief Description of Related Technology

Superfinishing processes such as abrasive machining, honing, and lapping are well-established processes applicable to simple flat or cylindrical surfaces. However, a significant limitation of these traditional superfinishing processes is the difficulty of finishing three-dimensional (3D) freeform surfaces. Many finishing processes, such as shape adaptive grinding (SAG), continuously processed polishing (CPP), elastic emission machining (EEM), and magnetic field-assisted finishing (MAF) have been developed to accommodate surface finishing of 3D freeform surfaces.

MAF is a non-direct contact finishing process which uses ferrous metal particles mixed with abrasive particles and fluid. This mixture or slurry can be attached to a rotating spindle with an either permanent or electro magnet to form a flexible magnetized abrasive brush. Surface finishing can then be achieved by rotation, translation, or oscillation of the flexible magnetic abrasive brush.

Due to the flexibility of the shape of the tool, MAF has been applied to not only a wide range of materials, such as steel and ceramics, but also both magnetic and non-magnetic substrates by adjusting the process parameters and the slurry contents. Thus, MAF can be applied to finely finish razor blades, tool inserts, finely patterned molds, and electronic components to improve surface finish. MAF is limited, however, by a narrow range of material removal rate—about $10^{-1}$ to about $10^{0}$ $mm^3/min$—and attainable surface roughness on the finished surface (about $10^{-1}$ to about $10^{-1}$ nm), which prevent effective scale-up of the process.

Accordingly, improved brush compositions that can be used in MAF are needed.

SUMMARY

In one aspect, the disclosure relates to a brush composition for magnetic field-assisted finishing, the brush composition comprising a carrier fluid, solid lubricant nanoplatelets dispersed in the carrier fluid, abrasive particles dispersed in the carrier fluid, and magnetic particles dispersed in the carrier fluid.

In another aspect, the disclosure relates to a brush composition for magnetic field-assisted finishing, the brush composition comprising a carrier fluid having a kinematic viscosity in a range of about 1,000 centistokes to about 100,000 centistokes, a solid lubricant dispersed in the carrier fluid, abrasive particles dispersed in the carrier fluid, and magnetic particles dispersed in the carrier fluid.

In another aspect, the disclosure relates to a brush composition for magnetic field-assisted finishing, the brush composition comprising a carrier fluid having a kinematic viscosity of at least about 500,000 centistokes; optionally, a solid lubricant dispersed in the carrier fluid; abrasive particles dispersed in the carrier fluid; and magnetic particles dispersed in the carrier fluid. In some refinements, the brush composition can be free or substantially free of solid lubricants, for example containing not more than 0.0001, 0.001, or 0.01 wt. % solid lubricants based on the brush composition.

In another aspect, the disclosure relates to a brush composition for magnetic field-assisted finishing, the brush composition comprising a carrier fluid (e.g., a high-viscosity carrier fluid); optionally, a solid lubricant dispersed in the carrier fluid; abrasive particles dispersed in the carrier fluid; and magnetic particles dispersed in the carrier fluid; wherein the abrasive particles and the magnetic particles are present in a combined amount of at least 70 wt. % in the brush composition (e.g., at least 70, or 80 wt. % and/or up to 85, 90, or 95 wt. % abrasive and magnetic materials combined). In some refinements, the brush composition can be free or substantially free of solid lubricants, for example containing not more than 0.0001, 0.001, or 0.01 wt. % solid lubricants based on the brush composition.

The brush compositions of the disclosure can advantageously improve the quality of the surface finish and extend the life of an MAF brush.

In embodiments, the carrier fluid comprises an oil. In embodiments, the carrier fluid is present in the brush composition in an amount in a range from 30 wt. % to 80 wt. %, 10 wt. % to 80 wt. %, 10 wt. % to 50 wt. %, or 15 wt. % to 25 wt. % based on the brush composition.

In embodiments, the carrier fluid has a kinematic viscosity in a range of about 3,000 centistokes to about 10,000 centistokes.

In embodiments, the carrier fluid has a kinematic viscosity in a range of about 750,000 centistokes to about 1,200,000 centistokes.

In embodiments, the solid lubricant nanoplatelets have an average diameter ($D_{SL}$) in a range of 0.1 μm to 500 μm (i.e., diameter of solid lubricant). In embodiments, the solid lubricant nanoplatelets have an average thickness ($T_{SL}$) in a range of 0.3 nm to 20 nm (i.e., thickness of solid lubricant). In embodiments, the solid lubricant nanoplatelets have an aspect ratio ($D_{SL}/T_{SL}$) in a range of 100 to 10000 (i.e., aspect ratio of solid lubricant). In embodiments, the solid lubricant nanoplatelets have an average diameter ($D_{SL}$) in a range of 0.1 μm to 500 μm, an average thickness (Ta) in a range of 0.3 nm to 20 nm; and an aspect ratio ($D_{SL}/T_{SL}$) in a range of 100 to 10000.

In embodiments, the solid lubricant nanoplatelets have a specific surface area in a range of 25 $m^2/g$ to 500 $m^2/g$.

In embodiments, the solid lubricant (e.g., nanoplatelets or other nanoparticles) comprises a material selected from the group consisting of graphite, hexagonal boron nitride, molybdenum disulfide, tungsten disulfide, and combinations or mixtures thereof.

In embodiments, the solid lubricant nanoplatelets comprise exfoliated graphite nanoplatelets (EGN).

In embodiments, the solid lubricant (e.g., nanoplatelets or other nanoparticles) is present in the brush composition in an amount in a range from 0.01 wt. % to 5 wt. % based on the brush composition.

In embodiments, the solid lubricant comprises nanoparticles having an average diameter in a range of 1 nm to 1000 nm.

In embodiments, the abrasive particles are selected from the group consisting of diamond dust (e.g., synthetic diamonds), pumice, iron(III) oxide, iron particles, steel (e.g., steel abrasives), sand, corundum (e.g., natural aluminum oxide), garnet, sandstone, tripoli (rotten stone), powdered feldspar, staurolite, borazon (cubic boron nitride or cBN), ceramics (e.g., ceramic aluminum oxides, ceramic iron oxides), glass powder, silicon nitride, silicon carbide (carborundum), boron nitrides, zirconia, alumina, boron carbide slags, and combinations or mixtures thereof.

In embodiments, the abrasive particles have an average diameter ($D_{AP}$) in a range of 5 μm to 500 μm.

In embodiments, the abrasive particles are present in the brush composition in an amount in a range from 10 wt. % to 50 wt. %, 10 wt. % to 60 wt. %, 25 wt. % to 60 wt. %, or 30 wt. % to 50 wt. % based on the brush composition.

In embodiments, a ratio of an average diameter of the abrasive particles ($D_{AP}$) to an average diameter of the solid lubricant nanoplatelets ($D_{SL}$) is at least 5.

In embodiments, a ratio of the number of the solid lubricant nanoplatelets ($N_{SL}$) to the number of the abrasive particles ($N_{AP}$) is at least 500.

In embodiments, a ratio of the surface area of the solid lubricant nanoplatelets ($SA_{SL}$) to the surface area of the abrasive particles ($SA_{AP}$) is at least 20.

In embodiments, the magnetic particles comprise ferromagnetic iron particles.

In embodiments, the magnetic particles have an average diameter ($D_{M}P$) in a range of 5 μm to 500 μm.

In embodiments, the magnetic particles are present in the brush composition in an amount in a range from 10 wt. % to 50 wt. %, 10 wt. % to 60 wt. %, 25 wt. % to 60 wt. %, or 30 wt. % to 50 wt. % based on the brush composition.

In embodiments, a weight ratio of abrasive particles: magnetic particles present in the brush composition is in a range of 3:1 to 1:3 or 1.5:1 to 1:1.5.

In embodiments, a weight ratio of combined abrasive particles and magnetic particles:carrier fluid present in the brush composition is in a range of 8:1 to 1:4 or 6:1 to 3:1.

In embodiments, the brush composition further comprises one or more additives selected from the group consisting of biocides (e.g., antimicrobial agents and fungicides such as isothiazolinones), viscosity-control agents (e.g., thickening or thinning agent to increase or decrease viscosity), wetting agents, film-forming agents, antifoam agents, and/or corrosion inhibitors.

In another aspect, the disclosure relates to a syringe delivery system comprising a syringe body defining an interior volume and an outlet orifice, a brush composition of disclosure contained within the interior volume of the syringe body, and a plunger means for expelling the brush composition from the interior volume of the syringe body via the outlet orifice of the syringe body.

In another aspect, the disclosure relates to a method for finishing a surface of a workpiece, the method comprising providing a tool comprising a rotatable magnetic head, applying and holding in place a brush composition of the disclosure at a surface of the rotatable magnetic head, and contacting a surface of a workpiece with the brush composition while rotating the magnetic head of the tool, thereby finishing the surface of the workpiece. In embodiments, the rotatable magnetic head comprises at least one of an electromagnet and a permanent magnet. In embodiments, after finishing the surface of the workpiece, the surface has a surface roughness (Ra) value on a nanometer scale. In embodiments, the workpiece surface is a three-dimensional (3D) freeform surface.

In another aspect, the disclosure relates to a system for magnetic field-assisted finishing, the system comprising a tool comprising a rotatable magnetic head and a brush composition of the disclosure.

BRIEF DESCRIPTION OF THE DRAWINGS

For a more complete understanding of the disclosure, reference should be made to the following detailed description and accompanying drawings wherein.

DETAILED DESCRIPTION

The disclosure relates to brush compositions for magnetic field-assisted finishing (MAF). Advantageously, the brush compositions can improve MAF processes by using a solid lubricant, for example in the form of nanoparticles or nanoplatelets, such as exfoliated graphite nanoplatelets (EGNs), which can help in preserving the sharp edges of the abrasive particles, thereby extending the life of the brush.

Figure 1:
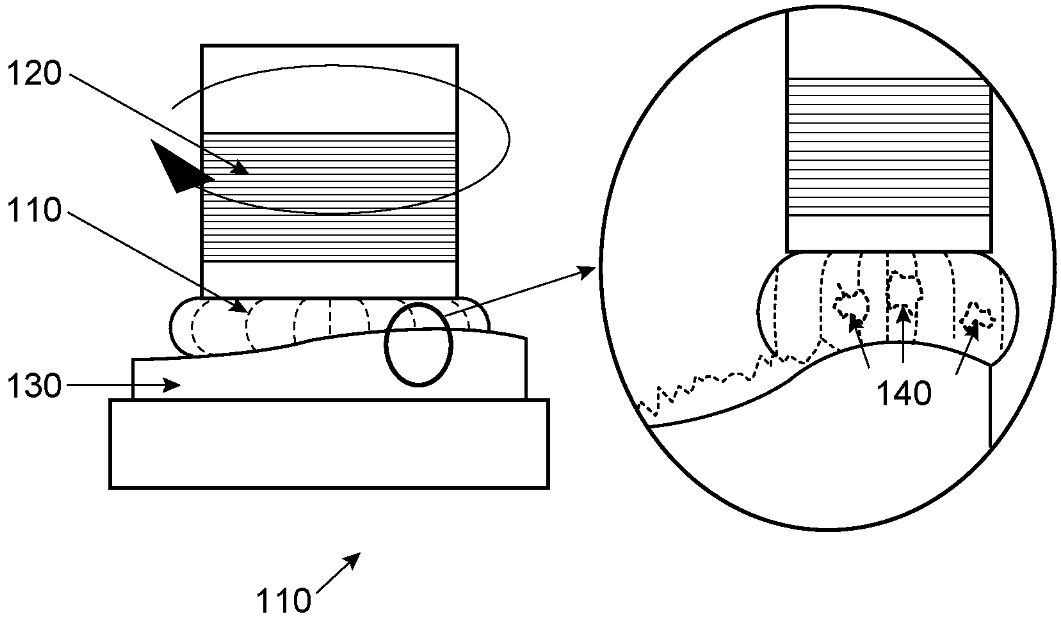
FIG. 1 is a schematic of an MAF process.
Figure 2A:
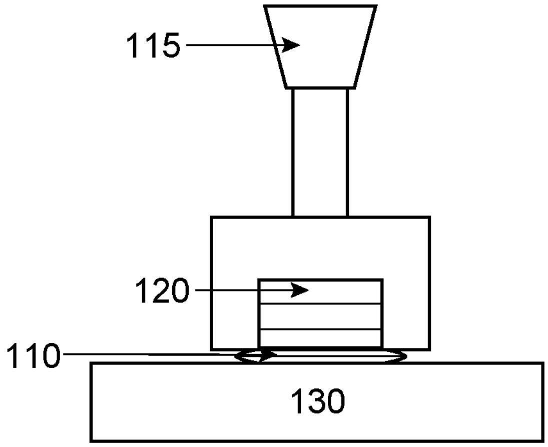
FIG. 2A is a schematic of an experimental MAF system.
Figure 2B:
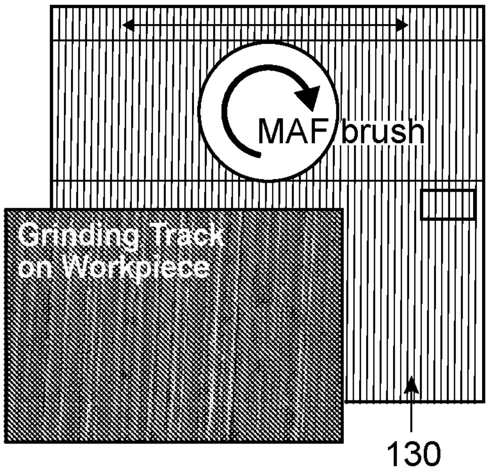
FIG. 2B is a schematic diagram of a workpiece and the brush movement.

FIGS. 1 & 2A-2B illustrate schematics of an MAF process 100 with a brush composition 110, for example containing a solid lubricant, iron or other magnetic particles, and abrasive particles in a carrier fluid medium. The brush 110 is attached to a spindle 115 of a CNC machine using a permanent magnet or an electromagnet 120. As the brush 110 translates and rotates on the surface of a workpiece 130, superfinishing like other surface finishing processes is achieved by removing extremely small segments 140 of the work material from the surface by the abrasive particles in the brush. The material removal on the work surface by MAF occurs by micro-chipping and micro-scratching due to the interactions between the abrasive particles and the workpiece 130. In general, the ferromagnetic iron particles in the brush 110 align themselves along the magnetic lines of force (from the magnet towards the workpiece 130) and the abrasive particles are entrapped along these ferromagnetic chains. The entrapped abrasive particles can interact with the work surface of the workpiece 130 to perform surface finishing. With the rotating spindle 115 and the translating CNC table, the relative rotational and linear motions against the work surface remove the small segments of materials (e.g., in micro/nanoscale, depending on the size of the abrasive particles) from the work surface.

As used herein, the term "wear," as would be understood by those skilled in the art, can refer to the gradual material removal from the surface by mechanical and/or chemical interactions between at least two interactive bodies. In MAF, the surface material is primarily removed by mechanical processes due to the abrasive particles in the brush. Two-body and three-body abrasive actions are two classifications of abrasive wear. Two-body abrasion describes a process in which the abrasive particles are constrained in the brush, causing sliding against the workpiece. Three-body abrasion describes a process in which the abrasive particles are not constrained, causing rolling against the workpiece. The wear rates in two-body abrasion are expected to be about three times greater than those of three-body abrasion. In two-body abrasion, the abrasive particles are more rigidly held by the brush, and therefore can more aggressively cut into the workpiece. In contrast, in three-body abrasion, the abrasive particles are more loosely held by the brush, and therefore can result in a more mild material removal. Consequently, the material removal rate (MRR) can be affected by the rigidity and flexibility of the brush composition. The rigidity (or flexibility) of the brush can be impacted, for example, by the magnetic force, the viscosity of the brush, and the magnetic permeability and susceptibility of the iron particles in the brush.

Brush Compositions

The brush compositions of the disclosure include a carrier fluid (e.g., an oil), optionally a solid lubricant (e.g., solid lubricant nanoplatelets or other nanoparticles) dispersed in the carrier fluid, abrasive particles (e.g., carbon boron nitride (cBN)) dispersed in the carrier fluid, and magnetic particles (e.g., iron oxides) dispersed in the carrier fluid.

Carrier Fluid

The carrier fluids, for example carrier oils, that can be used in the brush composition are not particularly limited. More generally, any liquid medium can be used as long as there is no chemical reaction involved with the abrasive particles, the magnetic particles, and the solid lubricant. The carrier fluid is similarly selected to have a suitable viscosity, which is related to the flexibility/ability of the brush composition to conform to a workpiece geometry when used to polish a part as well as the ability of the brush composition to provide a stable suspension of its components during use. Suitable viscosity (e.g., "dynamic viscosity" or "absolute viscosity") values for the carrier fluid can be in a range from 800 cP to 1,200,000 cP (e.g., at a reference temperature of 20° C. or 25° C.), for example at least 800, 1000, 1500, 2000, 2500, 3000, 5000, 7000, 10,000, 25,000, 40,000, 50,000, 100,000, 250,000, or 500,000 cP and/or up to 8000, 10,000, 15,000, 20,000, 25,000, 30,000, 40,000, 50,000, 60,000, 75,000, 80,000, 90,000, 100,000, 250,000, 500,000, 750,000, 1,000,000, 1,200,000, 1,500,000, 2,000,000, 3,000,000, or 4,000,000 cP. Alternatively, or additionally, suitable kinematic viscosity values for the carrier fluid can be in a range from about 1000 cSt to about 100,000 cSt (e.g., at a reference temperature of 20° C. or 25° C.), for example, at least 1000, 1500, 2000, 2500, 3000, 5000, 7000, 10,000, 25,000, 30,000, 40,000, 50,000 or 60,000 cSt and/or up to 8000, 10,000, 15,000, 20,000, 25,000, 30,000, 50,000, 60,000, 75,000, 85,000, 90,000, 95,000 or 100,000 cSt. In embodiments, the carrier fluid has a kinematic viscosity in a range of about 3,000 cSt to about 10,000 cSt. In other embodiments, the carrier fluid has a higher kinematic viscosity, for example at least 100,000, 200,000, 300,000, 400,000, 500,000, 600,000, 750,000, or 900,000 cSt and/or up to 300,000, 400,000, 500,000, 750,000, 1,000,000, 1,200,000, 1,500,000, 2,000,000, 3,000,000, or 4,000,000 cSt, As would be understood by the person of skill in the art, the kinematic viscosity of the carrier fluid in terms of centistokes can be readily determined by dividing the viscosity of the carrier fluid in terms of centipoise by the density of the carrier fluid (in units of $g/cm^3$). The viscosity can be determined using any suitable rheometer, for example at a reference temperature of 20° C. or 25° C.

The carrier oils that can be used in the brush composition are not particularly limited and can include those generally known in the art as machining lubricant oils. In an embodiment, the carrier fluid is a hydrophobic oil, generally being formed from siloxane and/or hydrocarbon chains, although some degree of polar functionality (e.g., via ester functional groups) may be present in the hydrophobic oil. Accordingly, the carrier fluid can be substantially free (e.g., less than 1 wt. %, 0.1 wt. %, or 0.01 wt. %) of hydrophilic liquids (e.g., water, lower alcohols such as C1-C5 alkanols). Examples of suitable hydrophobic oils include silicone oils, ester oils, and/or hydrocarbon oils.

In embodiments, the carrier fluid includes a silicone oil. Silicone oils generally include liquid polymerized siloxanes with organic side chains. Silicone oils can be represented by repeat units, where $R^1$ and $R^2$ can be the same or different hydrocarbon groups, for example C1-C4 alkyl groups. Polydimethylsiloxane (PDMS) is a particularly suitable silicone oil, with $R^1$ and $R^2$ being methyl groups. Silicone oils are particularly useful because of their relatively high thermal stability and their lubricating properties.

In embodiments, the carrier fluid includes an ester oil. The ester oil is not particularly limited, and generally includes two or more hydrocarbon chains joined by one or more ester linkages, for example molecules having from 1 to 3 ester linkages and 4 to 70 carbon atoms (e.g., 3 ester linkages and 40 to 65 carbon atoms for triglyceride ester oils such as common natural fatty acid triglycerides). The ester oil can be derived from a natural source (e.g., natural fat or oil such as animal- or vegetable-based fats and/or oils) or can be a synthetic ester (e.g., mono- or poly- (in particular di- or tri-) esters of alcohols (or polyhydric alcohols) and carboxylic acids). Examples of vegetable-based fats/oils include vegetable oil triglycerides such as soybean oil, safflower oil, linseed oil, corn oil, sunflower oil, olive oil, canola oil, sesame oil, cottonseed oil, palm oil, peanut oil, coconut oil, rapeseed oil, tung oil, castor oil, almond oil, flaxseed oil, grape seed oil, olive oil, safflower oil, sunflower oil, and/or walnut oil. Examples of animal-based fats/oils include animal oil triglycerides such as fish oil, tallow (beef, mutton), lard, suet (beef, mutton), neatsfoot oil, bone oil, and/or butter oil. Alternatively or additionally, the ester oil, whether from a natural or synthetic source, can be characterized as a mono-, di-, or tri-ester of (a) an alcohol (e.g., C1-C24, C1-C16, or C1-C8 mono-alcohol) or a polyhydric alcohol (e.g., C2-C12 or C2-C6 diols and triols, glycerin) with (b) one to three fatty acids (e.g., C6-C24, C10-C24, or C10-C20 saturated or unsaturated fatty acids). Mixtures of the various natural and synthetic ester oils also may be used as the carrier fluids.

In embodiments, the carrier fluid includes a hydrocarbon oil. The hydrocarbon oil is not particularly limited, and generally can include hydrocarbons (e.g., aliphatic and/or aromatic) distributed in a range from C5 to C40. Suitable hydrocarbon oils include mineral oils and synthetic oils. Examples of mineral oils include paraffin-based mineral oils or naphthene-based oils. Examples of synthetic oils include polyolefins (e.g., oligomers of alkenes such as ethylene, propylene, butene, and/or isobutene) and alkylaromatic compounds (e.g., mono- and/or poly-alkylated benzene and/or naphthalene).

In embodiments, the carrier fluid is present in the brush composition in an amount in a range from 30 wt. % to 80 wt. %, 10 wt. % to 80 wt. %, 10 wt. % to 50 wt. %, or 15 wt. % to 25 wt. % based on the brush composition. Suitably, the carrier fluid can be at least 10, 15, 20, 25, 30, 35, 40, 45, or 50 wt. % and/or up to 20, 25, 30, 35, 40, 50, 60, 70, or 80 wt. % of the brush composition. Alternatively or additionally, the amount of carrier fluid can be expressed in a ratio relative to the combined (or total) amount of abrasive particles and magnetic particles in the brush composition. For example, the weight ratio of combined abrasive particles and magnetic particles:carrier fluid present in the brush composition is in a range of 8:1 to 1:4, 8:1 to 1:2, 8:1 to 1:1, 7:1 to 2:1, 7:1 to 3:1, 6:1 to 3:1, 6:1 to 2:1, 5:1 to 2:1, 5:1 to 1:1, or 4:1 to 1:1.

Solid Lubricants

The brush compositions of the disclosure can include a solid lubricant. The solid lubricant suitably is in the form of a nanoparticle, for example a nanoplatelet. The solid lubricant in any of its various forms can include (e.g., can be formed from or contain) a material such as graphite, hexagonal boron nitride (hBN), molybdenum disulfide, tungsten disulfide, and combinations or mixtures thereof. For example, the graphite, hexagonal boron nitride, molybdenum disulfide, tungsten disulfide or other solid lubricant material can be in the form of a nanoplatelet, a spherical or quasi-spherical nanoparticle, or a mixture of both shapes. The solid lubricant material is not particularly limited and can include solid-phase materials that reduce friction between two surfaces sliding against each other. In the brush composition, solid lubricant protects the sharp edges of abrasives to extend the usable life and polishing efficiency of the brush composition. As described in more detail below, the relative amounts and/or sizes of the solid lubricant and the abrasive can be selected to further improve efficiency.

In embodiments, the solid lubricant includes solid lubricant nanoplatelets. The solid lubricant nanoplatelets can include exfoliated graphite nanoplatelets (EGN). The exfoliated graphite nanoplatelet or nanoparticle (EGN) material is derived from a graphite material such as natural graphite, synthetic graphite, and/or highly oriented pyrolitic graphite. The EGN material is suitably formed by exfoliating the starting graphite material (e.g., by microwaving). Additionally, the exfoliated graphite can then be pulverized (or subjected to another size-reduction technique) to obtain a desired size distribution of the EGN material. An expanded graphite is one which has been heated to separate individual platelets of graphite with or without an expanding agent (e.g., a chemical intercalant between layers of graphite such as an acid intercalant). An exfoliated graphite is a form of expanded graphite where the individual platelets are separated by heating with or without an agent (e.g., a polymer or polymer component). The graphite can be heated with conventional (thermal) heating, microwave (MW) energy, or radiofrequency (RF) induction heating. The microwave and radiofrequency methods provide a fast and economical method to produce exfoliated graphite. The combination of microwave or radiofrequency expansion and an appropriate grinding technique (e.g., planetary ball milling, vibratory ball milling), efficiently produces nanoplatelet graphite flakes with a high aspect ratio (e.g., up to 100, 1000, 10000 or higher), a high surface area (e.g., 25 $m^2/g$ to 500 $m^2/g$), and a controlled size distribution. Chemically intercalated graphite flakes are rapidly exfoliated by application of the microwave or radiofrequency energy, because the graphite rapidly absorbs the energy without being limited by convection and conduction heat transfer mechanisms. For example, microwave heating for a sufficient time (e.g., for times up to 5 minutes and/or as low as 1 second) at a suitable microwave power exfoliates the graphite and removes/boils the expanding intercalating chemical. Additional details regarding the formation of the EGN material may be found in Drzal et al. U.S. Publication Nos. 2004/0127621, 2006/0148965, 2006/0231792, and 2006/0241237 (incorporated herein by reference). An example of a commercial EGN suitable for use in the brush compositions of the disclosure is xGnPs, manufactured by XG Sciences in Lansing, MI, USA.

The graphite material suitably has not been oxidized, and thus contains only a minor amount of oxygen in the carbon network (e.g., resulting from natural oxidation processes and/or mechanical size reduction processes). As a result, the EGN material formed from the graphite material also has a minor amount of oxygen (e.g., surface-bound oxygen at exposed surfaces of the of the EGN material). Suitably, the EGN material (or starting graphite material) contains less than 10%, 8%, 5%, or 3% oxygen (on a number or weight basis), although residual amounts of oxygen ranging from 0.1%, 1%, or 3% or more are not uncommon at the lower end. Similarly, the EGN material suitably is free (or substantially free) of other functionalizing atoms or groups (e.g., nitrogen, halogens) that either are intentionally added to the EGN material or a result of natural impurities. Alternatively or additionally, the EGN material (or starting graphite material) can be characterized as containing at least 90%, 92%, 95%, or 97% carbon (on a number or weight basis).

The thickness of a single graphene sheet is about 0.3 nm (e.g., 0.34 nm). Individual EGN material particles (or platelets) used herein can include either single graphene sheet or multiple graphene sheets, and thus the thickness of the EGN material particles can generally range from 0.3 nm to 20 nm, or 0.3 nm to 10 nm or 15 nm (e.g., up to 2 nm, 4 nm, 6 nm, 8 nm, 10 nm, 12 nm, 15 nm, or 18 nm and/or at least 0.3 nm, 0.5 nm, 1 nm, 2 nm, 3 nm, 6 nm, 9 nm, or 12 nm). Alternatively, the thickness of the EGN material particles can be expressed in terms of the number of stacked graphene sheets they contain, for example 1 to 60 or 1 to 30 (e.g., 2 to 50, 3 to 40, or 5 to 30).

In embodiments, the solid lubricants and/or solid lubricant nanoplatelets have an average diameter ($D_{SL}$) in a range of 0.1 μm to 500 μm (i.e., diameter of solid lubricant), an average thickness ($T_{SL}$) in a range of 0.3 nm to 20 nm (i.e., thickness of solid lubricant); and an aspect ratio ($D_{SL}/T_{SL}$) in a range of 100 to 10000 (i.e., aspect ratio of solid lubricant). The solid lubricants according to the disclosure can generally have substantially flat, platelet-type shape with length and width dimensions (or equivalently, an average diameter or equivalent (circular) diameter) defining the primary surface area of the particles and being substantially larger than the thickness (or average thickness) direction substantially orthogonal to the faces of the solid lubricant nanoplatelets. Nanoplatelet diameters for the solid lubricant nanoplatelets ($D_{SL}$) can generally range from the sub-micron level to over 100 microns (e.g., 0.1 μm to 200 μm, 500 μm, or 1 mm), for example at least 0.1, 0.5, 1, 2, 3, 4, 5, 6, 8, 10, or 20 μm and/or up to 10, 15, 20, 30, 50, 70, 100, 200, 300, or 500 μm. Nanoplatelet thicknesses for the solid lubricant nanoplatelets ($T_{SL}$) can generally range from the sub-nanometer level to nanometer level (e.g., 0.3 nm to 20 nm) for example at least about 0.3, 0.6, 1, 2, 3, 6, 9, or 10 nm and/or up to 2, 4, 6, 8, 10, 12, 15, 18, or 20 nm. The nanoplatelets can suitably have an aspect ratio of at least 100, for example at least 200, 300, 500, 1000 or 2000 and/or up to 3000, 5000, or 10000. The aspect ratio can be defined as the diameter-to-thickness ratio or the width-to-thickness ratio (e.g., with the width being a characteristic (such as average or maximum) dimension in the graphene plane). A population of solid lubricant nanoplatelets (or other nanoparticles) can have a distribution of characteristic size parameters (e.g., diameter, thickness, aspect ratio), and the various property ranges can generally apply to the boundaries of the distribution (e.g., upper and lower boundaries such as 1%, 5%, or 10% lower and/or 90%, 95%, or 99% upper cumulative distribution boundaries) and/or the average of the distribution, where the distribution can be based on number, volume, surface area, or mass.

In embodiments, the solid lubricant nanoplatelets have a specific surface area in a range of 25 $m^2/g$ to 500 $m^2/g$. The specific surface area of the solid lubricant nanoplatelets (e.g., of the corresponding particle distribution) can be at least 25, 50, 75, 100, or 120 $m^2/g$ and/or up to 100, 150, 200, 300, or 500 $m^2/g$, for example based on a Brunauer, Emmett, and Teller (BET) determination.

In embodiments, the solid lubricant can be in a form other than a nanoplatelet, for example a more general nanoparticle shape. The solid lubricant nanoparticles can have a spherical, quasi-spherical, or irregular shape with a diameter (or equivalent spherical diameter) in a range of 1 nm to 1000 nm, for example at least 1, 2, 5, 10, 15, 20, 30, 40, 50, 70, 100, or 200 nm and/or up to 50, 100, 200, 300, 400, 500, 700, or 1000 nm. As noted above for nanoplatelets, the various ranges can generally apply to the boundaries of a nanoparticle size/diameter distribution (e.g., upper and lower boundaries such as 1%, 5%, or 10% lower and/or 90%, 95%, or 99% upper cumulative distribution boundaries) and/or the average of the distribution, where the distribution can be based on number, volume, surface area, or mass.

In embodiments, the solid lubricant, for in the form or nanoplatelets or other nanoparticles, is present in the brush composition in an amount in a range from 0.01 wt. % to 5 wt. % based on the brush composition. Suitably, the solid lubricant can be present in an amount from 0.01 wt. % to 3 wt. % or 0.01 wt. % to 5 wt. %, for example at least 0.01. 0.02, 0.05, 0.1, 0.15, 0.2, 0.3 or 0.5 wt. % and/or up to 0.3, 0.4, 0.5, 0.6, 0.7, 1, 2, 3, or 5 wt. % of the brush composition.

In some embodiments, the brush composition can be free or substantially free of solid lubricants, for example containing not more than 0.0001, 0.001, or 0.01 wt. % solid lubricants based on the brush composition. While the solid lubricant generally protects the abrasive materials to extend the usable life and polishing efficiency of the brush composition as described above, the solid lubricant can be omitted in some cases, for example where an intended polishing operation using the brush composition is to be performed over a relatively short time duration. In such cases, there is less polishing time over which the abrasive materials are worn or otherwise degraded, and the solid lubricant can be omitted for reduced cost and increased ease of formulation for the brush composition. Examples of such cases include polishing processes performed at relatively high rotation rates of the polishing tool's magnetic head (e.g., at least 1000, 2000, 3000, or 5000 rpm rotation rate), which in turn increases polishing speed and results in less total polishing time. Polishing at such high rotation rates is suitably performed when the brush composition has a relatively high viscosity (e.g., at least 300,000 or 500,000 cSt) and/or a relatively high solids loading (e.g., at least 60, 70, or 80 wt. % and/or up to 85, 90, or 95 wt. % abrasive and magnetic materials combined relative to the brush composition). A brush composition with a relatively high viscosity and/or a relatively high solids loading is more amenable to a high-rotation rate polishing process, because it better retains the brush composition on the magnetic head, and it resists the rotational forces that could otherwise fling the brush composition radially outward and off the magnetic head during polishing.

Abrasive Particles

The brush compositions of the disclosure include abrasive particles. The abrasive particles are not particularly limited and generally can include abrasives known in the art, for example including abrasives formed from natural or synthetic materials. In embodiments, the abrasive particles include diamond dust (e.g., synthetic diamonds), pumice, iron (III) oxide, iron particles, steel (e.g., steel abrasives), sand, corundum (e.g., natural aluminum oxide), garnet, sandstone, tripoli (rotten stone), powdered feldspar, staurolite, borazon (cubic boron nitride or cBN), ceramics (e.g., ceramic aluminum oxides, ceramic iron oxides), glass powder, silicon nitride, silicon carbide (carborundum), boron nitrides, zirconia, alumina, boron carbide slags, and combinations or mixtures thereof. The abrasives suitably are not magnetized (e.g., non-magnetic forms of iron for iron-containing abrasives).

In embodiments, the abrasive particles include cBN. The cBN particles can have a Knoop hardness of about 4700 kg/mm$^2$, which is higher than other conventional abrasive materials. Moreover, unlike diamond, cBN particles are relatively inert against ferrous metal, and therefore may not cause any undesired secondary effects on the workpiece during the MAF process.

In embodiments, the abrasive particles have an average diameter ($D_{AP}$) in a range of 5 μm to 500 μm. The abrasive particles generally have a quasi-spherical shape with sharp edges and can be characterized by an average diameter (or average equivalent spherical diameter) of at least 5, 10, 15, 20, 25, 30, 40, 50, 70, 100, or 150 μm and/or up to 50, 70, 100, 150, 200, 250, 300, 400, or 500 μm. The average can be a number-, weight-, volume-, or surface area-weighted average of the particle size distribution for the abrasive particles. Alternatively or additionally, the foregoing upper and lower boundaries for the diameter can represent 1, 5, or 10% and 90, 95, or 99% cut points, respectively, of the corresponding cumulative size distribution for the abrasive particles.

In embodiments, the abrasive particles are present in the brush composition in an amount in a range from 10 wt. % to 50 wt. %, 10 wt. % to 60 wt. %, 25 wt. % to 60 wt. %, or 30 wt. % to 50 wt. % based on the brush composition. Suitably, the abrasive particles can be at least 10, 15, 20, 25, 30, or 35 wt. % and/or up to 30, 35, 40, 45, 50, 55, or 60 wt. % of the brush composition.

In embodiments, a ratio of an average diameter of the abrasive particles ($D_{AP}$) to an average diameter of the solid lubricant nanoplatelets ($D_{SL}$) is at least 5. The diameter ratio ($D_{AP}/D_{SL}$) is suitably at least 5, 7, 10, 15, 20, 25, 30, 40, or 50 and/or up to 20, 30, 50, 70, 100, 200, 500, or 1000. The larger relative size of the abrasive particles compared to the solid lubricant nanoplatelets reflects an improved ability of the nanoplatelets to coat or otherwise cover the surface of the abrasive particles, which in turn provides protection for the abrasive particles (e.g., resulting in a longer useful life before replacement) and maintains the polishing ability of the brush composition (e.g., resulting in a lower roughness polished surface).

In embodiments, a ratio of the number of the solid lubricant nanoplatelets ($N_{SL}$) to the number of the abrasive particles ($N_{AP}$) is at least 500. The number ratio ($N_{SL}/N_{AP}$) is suitably at least 500, 1000, 2000, 3000, 5000, 10000, or 20000 and/or up to 2000, 5000, 10000, 20000, 50000, or 100000. The number of each type of particle can be represented/determined by the weight/mass loading of the particles divided by the mass of an individual particle of a given type, knowing the density of each particle material and considering the particles to be spheres or quasi-spheres of a given average diameter (for the abrasive particles or a solid lubricant nanoparticle) or a circular platelet of a given average diameter/thickness (for the solid lubricant nanoplatelets). As above, an excess of the solid lubricant nanoplatelets compared to the abrasive particles reflects an improved ability of the nanoplatelets to coat or otherwise cover the surface of the abrasive particles, along with the corresponding improvement in abrasive lifetime and machining performance.

In embodiments, a ratio of the surface area of the solid lubricant nanoplatelets ($SA_{SL}$) to the surface area of the abrasive particles ($SA_{AP}$) is at least 20. The surface area ratio ($SA_{SL}/SA_{AP}$) is suitably at least 20, 50, 70, 100, 120, or 150 and/or up to 70, 100, 150, 200, 300, or 500. The relative surface area for each type of particle can be represented/determined as above for the number ratio, but using the spherical and circular platelet shapes to determine the corresponding surface areas of the abrasive particles and solid lubricant nanoplatelets, respectively. As above, an excess of the solid lubricant nanoplatelet surface area compared to that of the abrasive particles reflects an improved ability of the nanoplatelets to coat or otherwise cover the surface of the abrasive particles, along with the corresponding improvement in abrasive lifetime and polishing performance.

Magnetic Particles

The brush compositions of the disclosure include magnetic particles. The magnetic particles according to the disclosure are not particularly limited and generally include any micron-sized particles (e.g., about 5 μm to 500 μm) that can be magnetized with an external magnetic/electrical field. More generally, the magnetic particles can include ferromagnetic particles, such as iron-containing particles or nickel-containing particles (e.g., providing electrical conduction or resistance). Suitable ferromagnetic particles include iron-containing magnetic metal oxides, for example those including iron either as Fe(II), Fe(III), or a mixture of Fe(II)/Fe(III). Non-limiting examples of such oxides include FeO, $Fe_3O_4$ (magnetite), and $\gamma$-$Fe_2O_3$ (maghemite). The magnetic particles can also be a mixed metal oxide of the type $M1_xM2_{3-x}O_4$, wherein M1 represents a divalent metal ion and M2 represents a trivalent metal ion. For example, the magnetic particles may be magnetic ferrites of the formula $M1Fe_2O_4$, wherein M1 represents a divalent ion selected from Mn, Co, Ni, Cu, Zn, or Ba, pure or in admixture with each other or in admixture with ferrous ions. Other metal oxides include aluminum oxide, chromium oxide, copper oxide, manganese oxide, lead oxide, tin oxide, titanium oxide, zinc oxide and zirconium oxide, and suitable metals for the mixed metal oxide can include Fe, Cr, Co, Ni or magnetic alloys.

In embodiments, the magnetic particles have an average diameter ($D_{MP}$) in a range of 5 μm to 500 μm. The magnetic particles generally have a spherical or quasi-spherical shape and can be characterized by an average diameter (or average equivalent spherical diameter) of at least 5, 10, 15, 20, 25, 30, 40, 50, 70, 100, or 150 μm and/or up to 50, 70, 100, 150, 200, 250, 300, 400, or 500 μm. The average can be a number-, weight-, volume-, or surface area-weighted average of the particle size distribution for the magnetic particles. Alternatively or additionally, the foregoing upper and lower boundaries for the diameter can represent 1, 5, or 10% and 90, 95, or 99% cut points, respectively, of the corresponding cumulative size distribution for the magnetic particles. In addition to enabling the brush composition to be manipulated or controlled by a magnetic field, the magnetic particles can be selected to have a suitable size, shape, and/or material component that also provides some ability to serve as a (secondary) abrasive material.

In embodiments, the magnetic particles are present in the brush composition in an amount in a range from 10 wt. % to 50 wt. %, 10 wt. % to 60 wt. %, 25 wt. % to 60 wt. %, or 30 wt. % to 50 wt. % based on the brush composition. Suitably, the magnetic particles can be at least 10, 15, 20, 25, 30, or 35 wt. % and/or up to 30, 35, 40, 45, 50, 55, or 60 wt. % of the brush composition. Alternatively or additionally, the amount of magnetic particles can be expressed in a ratio relative to the abrasive particles. For example, the weight ratio of abrasive particles:magnetic particles present in the brush composition can be in a range of 3:1 to 1:3, 2:1 to 1:2, 1.5:1 to 1:1.5, 1.25:1 to 1:1.25, 1.1:1 to 1:1.1, or about 1.

Additives

The brush composition can further include one or more additives, such as biocides (e.g., antimicrobial agents and fungicides such as isothiazolinones), viscosity-control agents (e.g., thickening or thinning agent to increase or decrease viscosity), wetting agents, film-forming agents, antifoam agents, and/or corrosion inhibitors. The brush composition can include one or more processing additives. The additives can be included in any desired amount, for example 0.01 wt. % to 2 wt. % or 0.01 wt. % to 5 wt. % relative to the brush composition.

Methods of Use

The disclosure also relates to methods for finishing a surface of a workpiece. The methods include providing a tool having a rotatable magnetic head (e.g., a rotatable spindle at a distal end of a tool), applying and holding in place the brush composition of the disclosure at a surface of the rotatable magnetic head, and contacting a surface of a workpiece with the brush composition while rotating the magnetic head of the tool, thereby finishing (e.g., polishing) the surface of the workpiece. The rotation rate of the magnetic head during finishing or polishing can be selected as desired based on factors such as finishing or polishing speed (e.g., linear displacement rate of the magnetic head), total finishing or polishing time, final properties of the worked surface after finishing or polishing, etc. Examples of suitable rotation rates can range from 100 to 40,000 rpm or 500 to 15,000 rpm (revolutions per minute), such as at least 100, 200, 500, 700, 1000, 2000, 3000, 5000, 7000, or 10,000 rpm and/or up to 2000, 4000, 6000, 8000, 10,000, 12,000, 15,000, 20,000, 30,000 or 40,000 rpm.

At the time of use in a finishing process and as originally formed, the brush composition is suitably a well-mixed, essentially homogeneous dispersion of the abrasive, magnetic, and solid lubricant solid components in the carrier fluid medium. Mixing or blending to form the initial brush composition (or to re-mix a previously formed brush composition) can be performed using any suitable mechanical or other mixers known in the art for blending solids and liquids.

In embodiments, the rotatable magnetic head includes at least one of an electromagnet and a permanent magnet. The rotatable magnetic head can include either or both of an electromagnet and a permanent magnet. The brush composition is generally in the form of a viscous slurry given its oily carrier fluid base and high loading of solid particles dispersed therein, in particular the solid lubricant nanoplatelets, abrasive particles, and magnetic particles. The magnet is of sufficient magnetic strength and the brush composition has a sufficiently high loading of magnetic particles so that the brush composition is held in place against the rotatable magnetic head, for example when the magnetic head is in rotating contact with the workpiece surface during finishing. The electromagnet provides a means to adjust or control the magnetic field strength of the magnetic head in a given application. The permanent magnet provides a means to increase or decrease the net magnetic field strength, for example in combination with the electromagnet during finishing and/or without the electromagnet. An electromagnet is easier to control the magnetic field strength and/or spatial variance of the magnetic field during finishing. A permanent magnet can provide enough magnetic field strength (e.g., with multiple magnets stacked) to hold the brush composition in place against the rotatable magnetic head during finishing, but a permanent magnet does not generally provide spatial variance of the magnetic field throughout the tool.

The methods can be performed with a magnetic flux density ranging from about 150 mT to about 1500 mT (i.e., 1.5 T), for example at least about 150, 200, 220, 250, 275, 300, 325, 350, 400, 500, 600, 700, 800, 900, or 1000 mT and/or up to about 275, 300, 325, 350, 375, 380, 400, 500, 600, 700, 800, 900, 1000, 1100, 1200, 1300, 1400, or 1500 mT. In embodiments, the magnetic flux density is about 220 mT. In embodiments, the magnetic flux density is about 350 mT.

Suitable examples of permanent magnets can include, for example, neodymium magnets. Other permanent magnets and electro magnets that are known and used in the art are also suitable.

In embodiments, after finishing the surface of the workpiece, the surface has a surface roughness (Ra) value on a nanometer scale. Suitably, the surface of workpiece after finishing can be characterized as having a final absolute surface roughness on the nanonscale, for example less than about 100 nm. The surface roughness can reflect an average roughness for the finished surface. Suitable ranges for surface roughness can include at least 0.01, 0.1, 1, 2, 3, 5, or 10 nm and/or up to 1, 2, 5, 7, 10, 20, 30, 50, 70, or 100 nm.

In embodiments, the workpiece surface is a three-dimensional (3D) freeform surface. The freeform surface can include one or more surface features such as pores or internal cavities, sharp edges or regions with high degrees of curvature, etc. A "freeform surface" is a generally understood term of art to describe the skin or outer surface of a three-dimensional geometric element. Freeform surfaces typically do not have rigid radial dimensions, unlike regular surfaces such as planes, cylinders and conic surfaces. Freeform surfaces are used to describe forms in essentially all engineering design disciplines, for example designs for such as various consumer goods products, turbine blades, car bodies, and boat hulls. A freeform surface suitably can be described by nonuniform rational B-spline (NURBS) mathematics to characterize its outer surface, although other method descriptions such as Gordon surfaces or Coons surfaces can be used.

Systems of Use

The disclosure also relates to systems that use the brush composition of the disclosure (e.g., syringe delivery systems, and systems for MAF).

The syringe delivery systems include a syringe body defining an interior volume and an outlet orifice and the brush composition of the disclosure contained within the interior volume of the syringe body. The syringe delivery systems also include a plunger means for expelling the brush composition from the interior volume of the syringe body via the outlet orifice of the syringe body.

The systems for magnetic field-assisted finishing include a tool having a rotatable magnetic head (e.g., a rotatable spindle at a distal end of a tool, as described herein, and the brush composition of the disclosure (e.g., as a separate composition to be applied to the rotatable magnetic head prior to use).

EXAMPLES

The following examples illustrate the disclosed compositions and methods, but are not intended to limit the scope of any claims thereto.

Experimental Setup and Materials

MAF experiments were conducted on a CNC milling machine (either PC-Mill 50 EMCO, or VF4, HAAS). The schematic diagram of the experimental setup, including the spindle and flexible MAF brush, is shown in FIG. 1. Multiple permanent magnets (neodymium disk countersunk hole magnets, each with a diameter of 19 mm, thickness of 5 mm, and magnetic flux density of 220 mT, were inserted in the magnet holder to increase the magnetic force. The MAF brush was attached onto the surface of the magnet. The magnet holder was assembled into the spindle in the same manner of a typical milling tool, which allowed the brush to rotate and translate along the workpiece surface.

The flexible MAF brush included cubic boron nitride (cBN) particles as the abrasive particles (BN2000, LANDS Superabrasives Co., NY, USA), iron particles as the magnetic particles (mean diameter of 168 μm, #80 grit size, Carolina Biological Supply Co., NC, USA), silicone oil as the carrier fluid (KF-96, Shinetsu Chemical Co., Tokyo, Japan; kinematic viscosity of about 300,000 cSt at 25° C.), and exfoliated graphite nanoplatelets (EGNs) (M5 xGnPs, XG Sciences, MI, USA) as the solid lubricant. The workpiece material was mold steel (CENA-V, Hitachi Materials, Japan).

The surface of the workpiece was initially prepared by a grinding process with white-fused alumina wheel (having a mean diameter of 68 μm and #220 grit size), which generated the grinding tracks in one direction of the work surface. As shown in FIGS. 2A and 2B, the rotating MAF brush traveled across the grinding tracks, thereby removing excess materials on the top surface.

Example 1—Evaluation of Solid Lubricant Nanoplatelets

A preliminary study on MAF with a spindle speed of 800 rpm and a feed rate of 80 mm/min was conducted to determine the content of EGNs in the brush and to compare two grades of EGNs in the composition. The two EGNs analyzed in this study include the M5 and C300 grades of xGnPs available from XG Sciences, and the dimensions of the solid lubricant nanoplatelets are provided in Table 1, below.

TABLE 1

Specifications of Evaluated EGNs

| EGN | Mean Diameter (μm) | Mean Thickness (nm) |
|---|---|---|
| M5 xGnPs | ~5 | ~6-8 |
| C300 xGnPs | ~1-2 | <~2 |

A MAF process using brush compositions including no EGNs, 0.3 wt % EGNs, and 0.6 wt % EGNs was carried out for 90 passes on the CENA-V workpieces. The CENA-V workpieces had dimensions of 62×62×11 mm.

Figure 3:
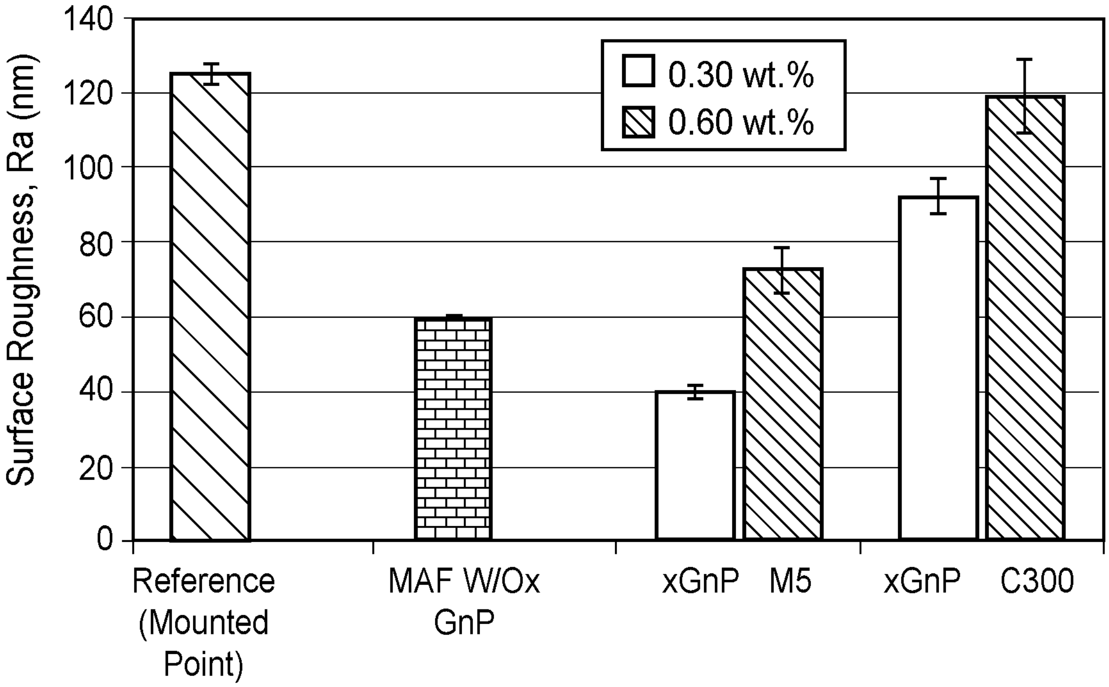
FIG. 3 is a graph of the effect of the grade of the solid lubricant in the brush composition on the surface roughness of the workpiece.

The results from the preliminary study are shown in FIG. 3. These results demonstrated that the addition of 0.3 wt % of EGNs significantly improved MAF performance, and that the grade of EGN had an impact on the process.

Example 2—Evaluation of Brush Composition

The diameter of abrasive particles, the magnetic flux densities, and the amount of EGN (M5 grade from Table 1 above) in the brush composition were evaluated. Table 2, below, provides the compositions of each of the evaluated compositions.

TABLE 2

| Evaluated Brush Compositions | | | |
|---|---|---|---|
| Run | Mean Abrasive Material Diameter, D (μm) | Magnetic Flux Density, B (mT) | Weight Fraction of EGN in MAF Brush (wt %) |
| 1 | 68 | 220 | — |
| 2 | 68 | 220 | 0.15 |
| 3 | 68 | 220 | 0.30 |
| 4 | 35 | 220 | — |
| 5 | 35 | 220 | 0.15 |
| 6 | 35 | 220 | 0.30 |
| 7 | 68 | 351 | — |
| 8 | 68 | 351 | 0.15 |
| 9 | 68 | 351 | 0.30 |
| 10 | 35 | 351 | — |
| 11 | 35 | 351 | 0.15 |
| 12 | 35 | 351 | 0.30 |

The spindle speed was fixed at 900 rpm and the feed rate was fixed at 70 mm/min. Each brush composition was performed with the forward and backward feed motions of the spindle until reaching 40 tool passes, at which point the surface quality was observed. Each composition was used to perform up to 80 additional tool passes, at which point the surface quality was again observed, as well as the wear condition of the cBN particles. The detailed experimental conditions are provided in Table 3, below.

TABLE 3

| Experimental Conditions | |
|---|---|
| MAF tool (mass) | Iron (0.8 g), cBN particle, (0.8 g), silicone oil (1.2 g) |
| Workpiece | Material: CENA-V<br>Size: 62 mm × 62 mm × 11 mm<br>Initial Surface: Ground using WA #220 (white fused alumina, 68 μm, wheel) |
| Solid lubricant nanoplatelet | Type: exfoliated graphite nanoplatelets (EGN)<br>Grade: M5 |
| Magnet | Neodymium permanent type, diameter = 19 mm |
| Spindle speed | 900 RPM |
| Feed rate | 70 mm/min |

The surface quality of the workpiece was measured both quantitatively and qualitatively. The quantitative assessment was based on the roughness value, $R_a$, defined as the arithmetic average of the absolute values of surface profile heights over the evaluation length. A smaller value of $R_a$ indicated a better overall surface quality. $R_a$ was measured by a contact surface profilometer (DEKTAK M6, Bruker; MA, USA). FIGS. 4A-4D shows the measured $R_a$ values of the workpieces before MAF, after 40 tool passes, and after 80 tool passes for each of Runs 1-12. The roughness values shown in FIGS. 4A-4D were calculated by averaging at least five line-measurements by the surface profilometer for each workpiece. As would be understood by the skilled person, any MAF process with an appropriate selection of abrasive size should monotonically decrease the $R_a$ value, as evident in FIGS. 4A-4D.

Figure 4A:
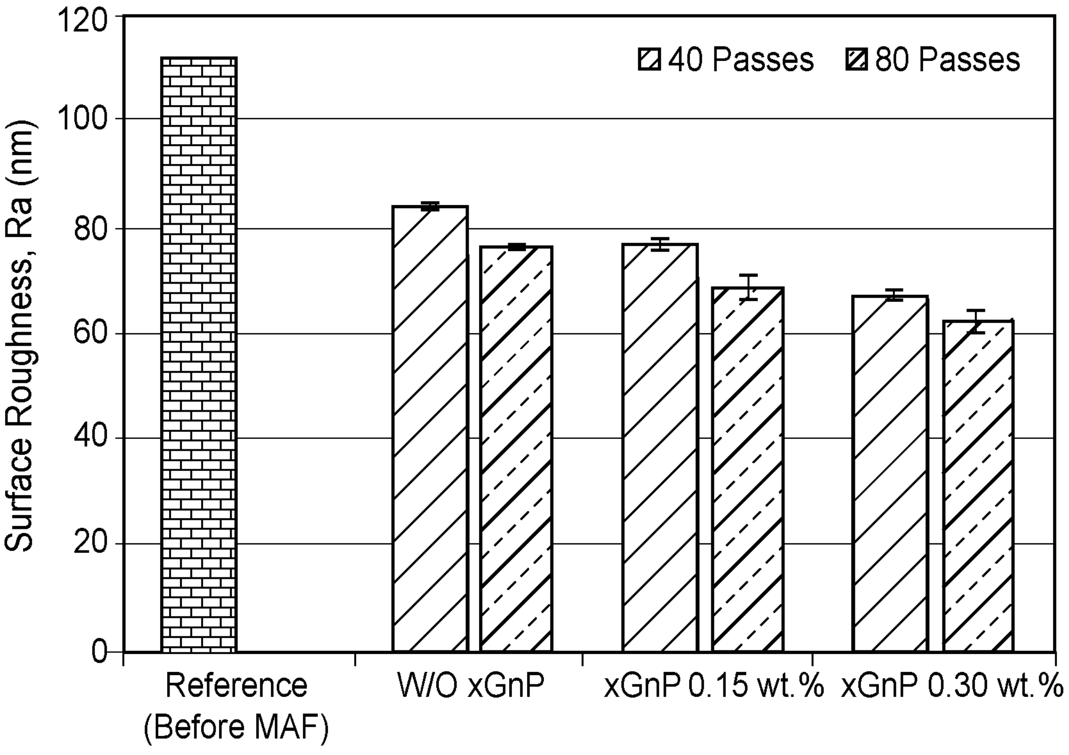
FIG. 4A is a graph of the effect of the concentration of the solid lubricant on the surface roughness (mean diameter of abrasive particles=68 μm; magnetic flux density=220 mT).
Figure 4B:
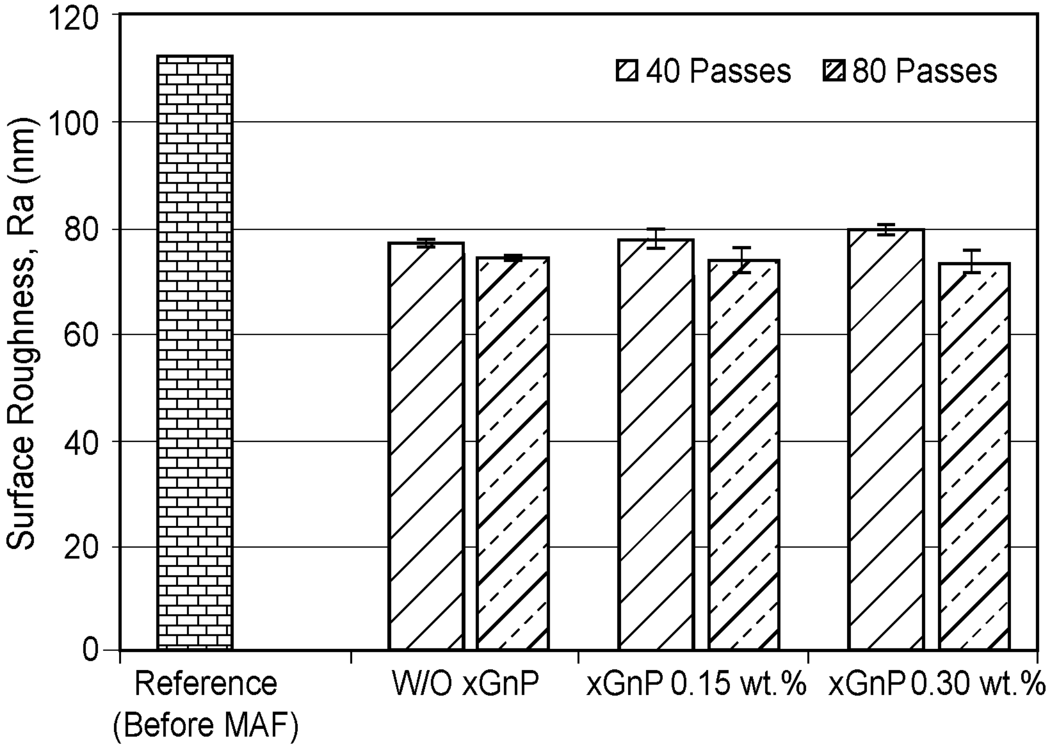
FIG. 4B is a graph of the effect of the concentration of the solid lubricant on the surface roughness (mean diameter of abrasive particles=35 μm; magnetic flux density=220 mT).
Figure 4C:
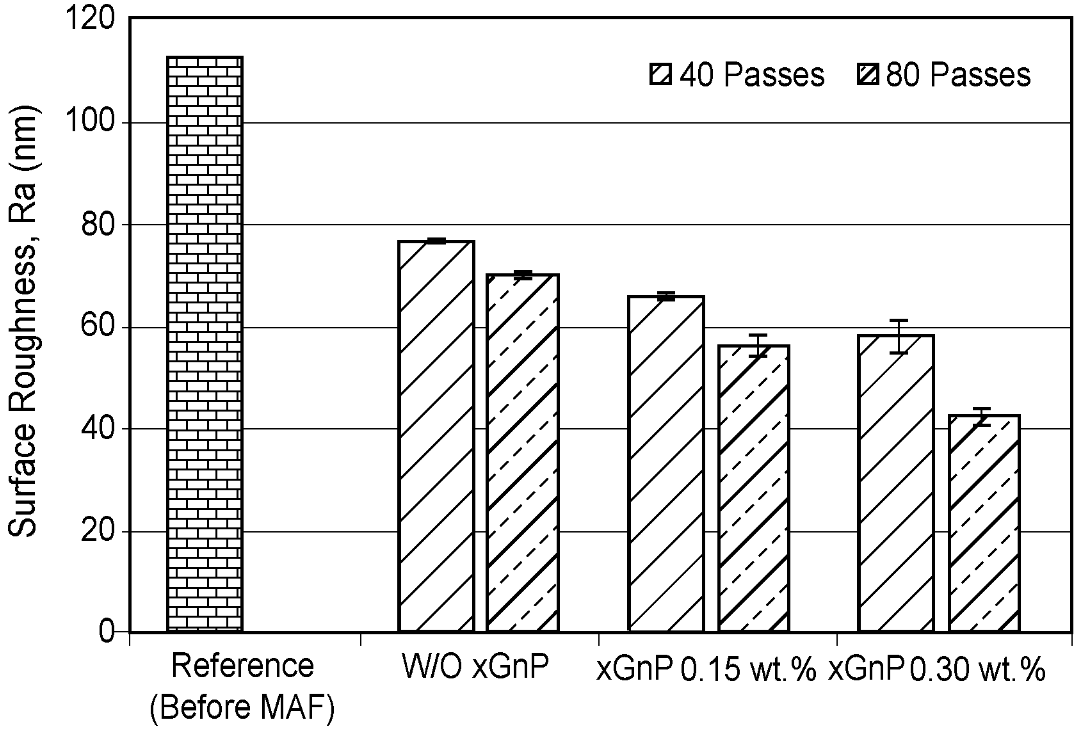
FIG. 4C is a graph of the effect of the concentration of the solid lubricant on the surface roughness (mean diameter of abrasive particles=68 μm; magnetic flux density=351 mT).
Figure 4D:
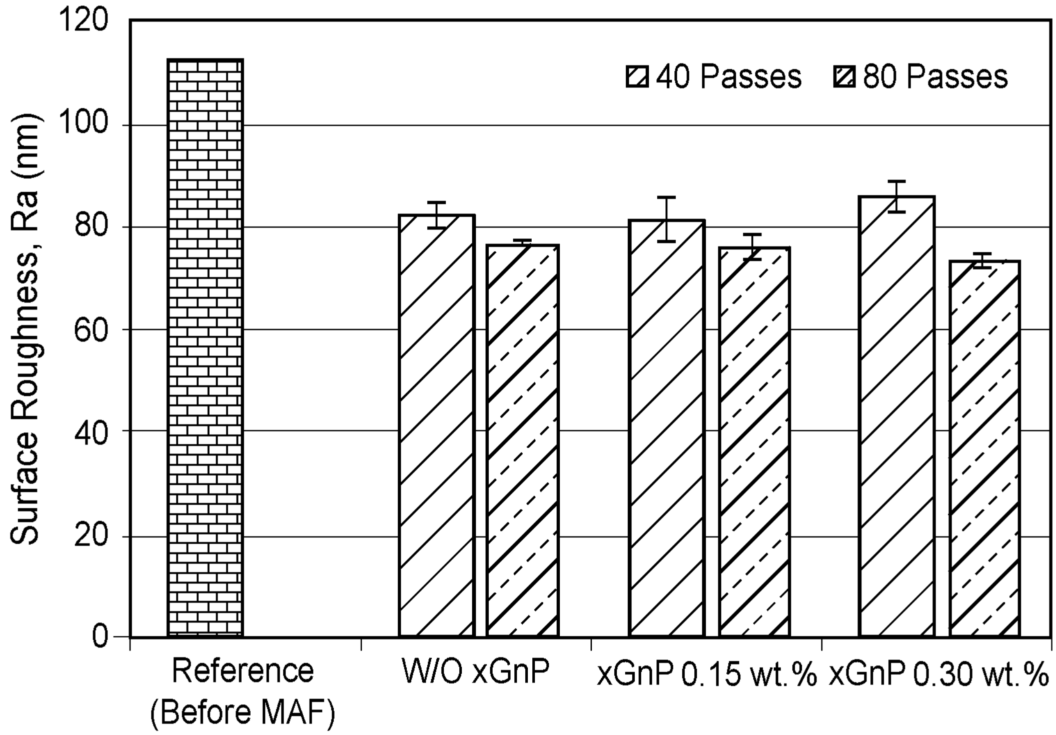
FIG. 4D is a graph of the effect of the concentration of the solid lubricant on the surface roughness (mean diameter of abrasive particles=35 μm; magnetic flux density=351 mT).

Between cBN particles having a mean diameter of 68 μm and 35 μm, the amount of the EGN showed to have impacted the brush composition in two distinct trends. With the larger cBN particles (FIGS. 4A and 4C), an increase in the content of EGN significantly degreased the $R_a$ value, which demonstrated the improved efficiency of the composition. FIGS. 4B and 4D indicated no prominent improvement of the $R_a$ value as the content of the EGN increased. Furthermore, in the cases with the higher magnetic flux density (351 mT) and the larger cBN particles, the increased content of EGN significantly improved the surface quality in comparison to the lower magnetic flux density (220 mT) and the smaller cBN particles.

Figure 5:
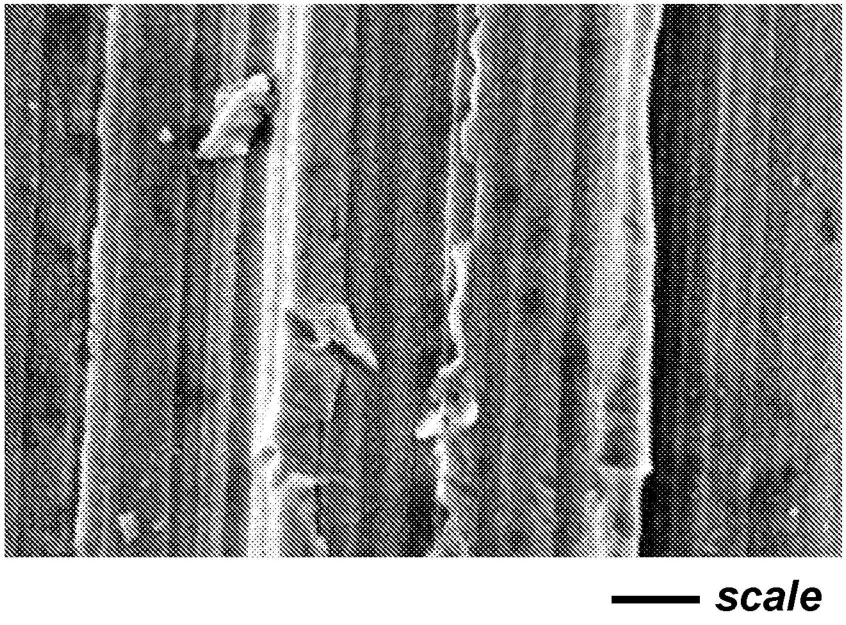
FIG. 5 is a scanning electron microscopy (SEM) image of a workpiece before MAF (scale bar: 2 μm).
Figures 6A, 6B, 6C, 6D, 6E, 6F, 6G, 6H, 6I, 6J, 6K, 6L:
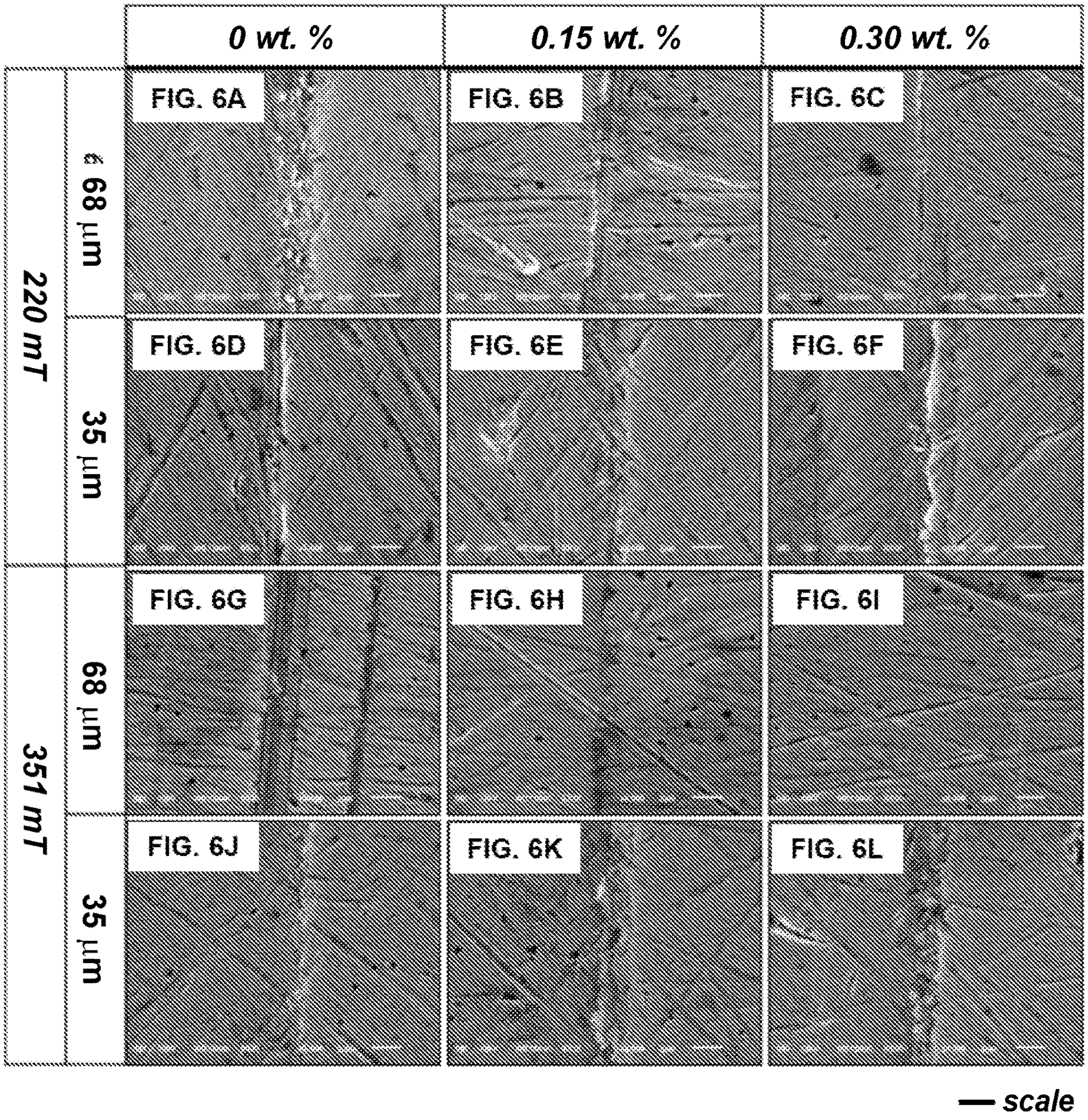
FIG. 6A is an SEM image of a workpiece after 80 passes (magnetic flux density=220 mT, mean diameter of abrasive particles=68 μm, 0 wt % solid lubricant, scale bar: 2 μm).
FIG. 6B is an SEM image of a workpiece after 80 passes (magnetic flux density=220 mT, mean diameter of abrasive particles=68 μm, 0.15 wt % solid lubricant, scale bar: 2 μm).
FIG. 6C is an SEM image of a workpiece after 80 passes (magnetic flux density=220 mT, mean diameter of abrasive particles=68 μm, 0.30 wt % solid lubricant, scale bar: 2 μm).
FIG. 6D is an SEM image of a workpiece after 80 passes (magnetic flux density=220 mT, mean diameter of abrasive particles=35 μm, 0 wt % solid lubricant, scale bar: 2 μm).
FIG. 6E is an SEM image of a workpiece after 80 passes (magnetic flux density=220 mT, mean diameter of abrasive particles=35 μm, 0.15 wt % solid lubricant, scale bar: 2 μm).
FIG. 6F is an SEM image of a workpiece after 80 passes (magnetic flux density=220 mT, mean diameter of abrasive particles=35 μm, 0.30 wt % solid lubricant, scale bar: 2 μm).
FIG. 6G is an SEM image of a workpiece after 80 passes (magnetic flux density=351 mT, mean diameter of abrasive particles=68 μm, 0 wt % solid lubricant, scale bar: 2 μm).
FIG. 6H is an SEM image of a workpiece after 80 passes (magnetic flux density=351 mT, mean diameter of abrasive particles=68 μm, 0.15 wt % solid lubricant, scale bar: 2 μm).
FIG. 6I is an SEM image of a workpiece after 80 passes (magnetic flux density=351 mT, mean diameter of abrasive particles=68 μm, 0.30 wt % solid lubricant, scale bar: 2 μm).
FIG. 6J is an SEM image of a workpiece after 80 passes (magnetic flux density=351 mT, mean diameter of abrasive particles=35 μm, 0 wt % solid lubricant, scale bar: 2 μm).
FIG. 6K is an SEM image of a workpiece after 80 passes (magnetic flux density=351 mT, mean diameter of abrasive particles=35 μm, 0.15 wt % solid lubricant).
FIG. 6L is an SEM image of a workpiece after 80 passes (magnetic flux density=351 mT, mean diameter of abrasive particles=35 μm, 0.30 wt % solid lubricant, scale bar: 2 μm).

To confirm the change in the surface roughness with respect to the abrasive particle size, amount of EGN, magnetic flux density, and the number of passes, the surfaces were qualitatively analyzed with scanning electron microscopy (SEM) images. As shown in FIG. 5, the SEM image of the sample surface prior to MAF experiments showed the grinding tracks as expected after grinding. FIGS. 6A-6L show the surfaces after each run. It can be observed from FIGS. 6A-6L, that the performance of MAF was improved in the sense that the initial grinding tracks were effectively removed with the larger cBN particles in the presence of EGN. The impact of EGN on the removal of the grinding track was more significant when a higher magnetic flux density was applied. As the amount of EGN increased with the larger cBN particles, the grinding tracks were also removed significantly. With the smaller cBN particles (FIGS. 6D-6F; 6J-6L), the grinding marks were still visible even after 80 passes even with the presence of EGN in the brush. This suggested that the content of EGN and magnetic flux density did not significantly impact removal of the grinding tracks when present with smaller cBN particles, which is consistent with the quantitative results in FIGS. 4B and 4D.

Figure 7A:
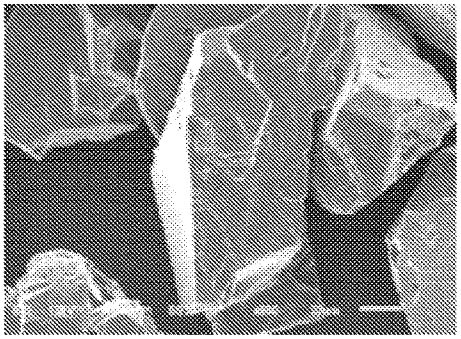
FIG. 7A is an SEM image of abrasive particles having a mean diameter of 68 μm before MAF (scale bar: 20 μm).
Figure 7B:
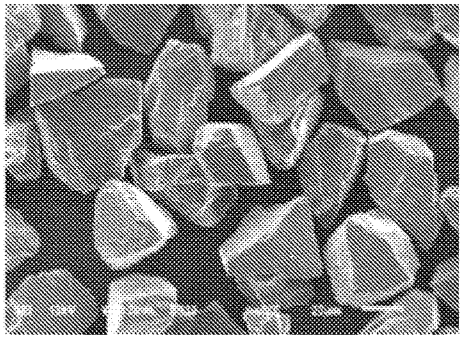
FIG. 7B is an SEM image of abrasive particles having a mean diameter of 35 μm before MAF (scale bar: 20 μm).
Figures 8A, 8B, 8C, 8D, 8E, 8F, 8G, 8H, 8I, 8J, 8K, 8L:
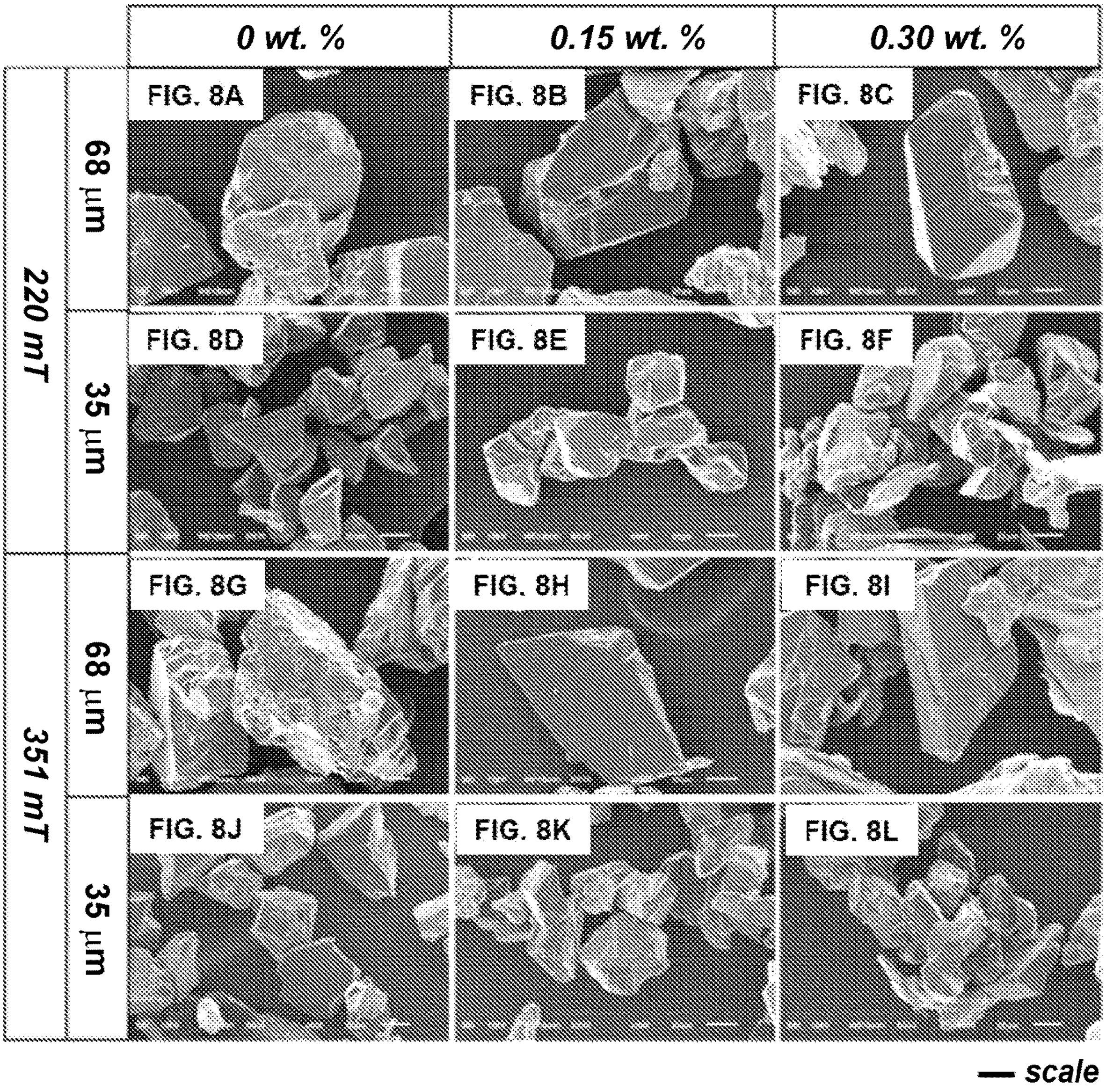
FIG. 8A is an SEM image of abrasive particles after 80 passes (magnetic flux density=220 mT, mean diameter of abrasive particles=68 μm, 0 wt % solid lubricant, scale bar: 20 μm).
FIG. 8B is an SEM image of abrasive particles after 80 passes (magnetic flux density=220 mT, mean diameter of abrasive particles=68 μm, 0.15 wt % solid lubricant, scale bar: 20 μm).
FIG. 8C is an SEM image of abrasive particles after 80 passes (magnetic flux density=220 mT, mean diameter of abrasive particles=68 μm, 0.30 wt % solid lubricant, scale bar: 20 μm).
FIG. 8D is an SEM image of abrasive particles after 80 passes (magnetic flux density=220 mT, mean diameter of abrasive particles=35 μm, 0 wt % solid lubricant, scale bar: 20 μm).
FIG. 8E is an SEM image of abrasive particles after 80 passes (magnetic flux density=220 mT, mean diameter of abrasive particles=35 μm, 0.15 wt % solid lubricant, scale bar: 20 μm).
FIG. 8F is an SEM image of abrasive particles after 80 passes (magnetic flux density=220 mT, mean diameter of abrasive particles=35 μm, 0.30 wt % solid lubricant, scale bar: 20 μm).
FIG. 8G is an SEM image of abrasive particles after 80 passes (magnetic flux density=351 mT, mean diameter of abrasive particles=68 μm, 0 wt % solid lubricant, scale bar: 20 μm).
FIG. 8H is an SEM image of abrasive particles after 80 passes (magnetic flux density=351 mT, mean diameter of abrasive particles=68 μm, 0.15 wt % solid lubricant, scale bar: 20 μm).
FIG. 8I is an SEM image of abrasive particles after 80 passes (magnetic flux density=351 mT, mean diameter of abrasive particles=68 μm, 0.30 wt % solid lubricant, scale bar: 20 μm).
FIG. 8J is an SEM image of abrasive particles after 80 passes (magnetic flux density=351 mT, mean diameter of abrasive particles=35 μm, 0 wt % solid lubricant, scale bar: 20 μm).
FIG. 8K is an SEM image of abrasive particles after 80 passes (magnetic flux density=351 mT, mean diameter of abrasive particles=35 μm, 0.15 wt % solid lubricant, scale bar: 20 μm).
FIG. 8L is an SEM image of abrasive particles after 80 passes (magnetic flux density=351 mT, mean diameter of abrasive particles=35 μm, 0.30 wt % solid lubricant, scale bar: 20 μm).

In an MAF brush composition, it is desirable to maintain the sharp edges of the abrasive as long as possible to retain the abrasive actions by the abrasive particles, whether cBN particles as illustrated in these examples or otherwise. Thus, the SEM images of the cBN particles were taken prior to MAF experiments and after 80 passes in order to compare the changes in the edge conditions of the cBN particles. FIGS. 7A and 7B show the sharp edges of the cBN particles before MAF experiments, and FIGS. 8A-8L show the SEM images of the cBN particles after 80 passes, representing all 12 runs of the MAF experiments. It was surprising that the edges of the cBN particles after 80 passes became completely dull without EGN in the brush as shown in FIGS. 8A, 8D, 8G, and 8J. The larger cBN particles maintained relatively sharper edges after 80 passes when EGN was present at both magnetic flux densities: 220 mT, as shown in FIGS. 8B and 8C, and 351 mT, as shown in FIGS. 8H and 8I. In contrast, independent of the EGN content, it was observed that the edges of the smaller cBN particles became blunted after 80 passes, as shown in FIGS. 8D-8F at a magnetic flux density of 220 mT, and in FIGS. 8J-8L at a magnetic flux density of 351 mT.

After carrying out the MAF experiments with the same amount of EGN in the brush, larger cBNs maintained sharp edge, while smaller cBN particles demonstrated no improvement in the sharpness of cutting edges, independent of the EGN content in the brush.

Example 2 demonstrates that the presence of EGN in the brush had a significantly improved impact on larger abrasives (e.g., cBN) in both surface quality and edge sharpness.

Example 3—Evaluation of Abrasive Particle Size

The effect of EGN in MAF performance was evaluated with four abrasive (cBN) sizes: 12 μm, 44 μm, 90 μm, and 185 μm. The concentration of the EGN in the brush were limited to 0 wt % and 0.30 wt %. The number of passes was set to 80 and the magnetic flux density was set to 351 mT. Other parameters such as iron particle size and working gap were kept constant to observe the impact of EGN in relation to cBN particle size. In total, eight runs were performed on the same mold steels as used in Example 2 (ground with the same white fused alumina wheel), which are shown in Table 4, below.

TABLE 4

Evaluated Brush Compositions (Magnetic Flux Density = 351 mT)

| Run | Mean Abrasive Material Diameter, D (μm) | Weight Fraction of EGN in MAF Brush (wt %) |
|---|---|---|
| 13 | 12 | — |
| 14 | 12 | 0.30 |
| 15 | 44 | — |
| 16 | 44 | 0.30 |
| 17 | 90 | — |
| 18 | 90 | 0.30 |
| 19 | 185 | — |
| 20 | 185 | 0.30 |

Figure 9:
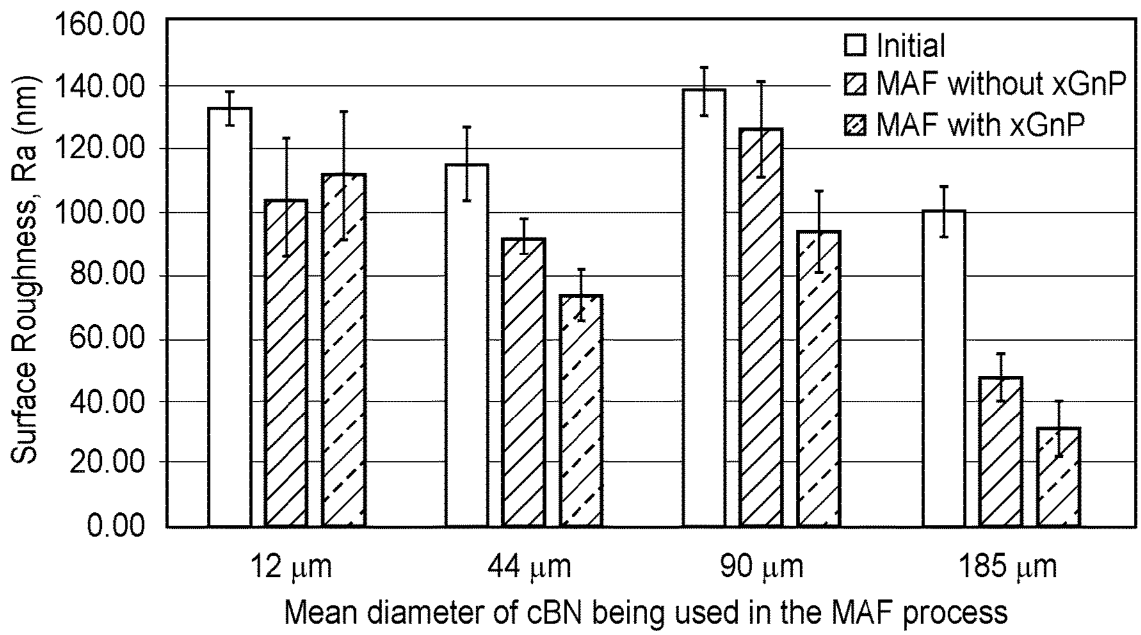
FIG. 9 is a graph of the surface roughness before and after MAF with brush compositions having various sized abrasive particles and various concentrations of solid lubricant.

The results of the surface quality before and after MAF, as well as with and without EGN, are shown in FIG. 9. Since the initial surface roughness was slightly different on each sample, the effectiveness of EGN was compared based on the percentage change in the surface roughness, as shown in Table 5, below.

TABLE 5

Surface Roughness Comparison Data

| Mean Abrasive Material Diameter, D (μm) | Initial Roughness, s, $R_a$ (nm) | Roughness after MAF (No EGN), $R_a$ (nm) | Roughness after MAF (0.3 wt % EGN) $R_a$ (nm) | % change |
|---|---|---|---|---|
| 12 | 132.95 | 104.24 | 111.24 | −6.72 |
| 44 | 114.76 | 92.20 | 73.55 | 20.23 |
| 90 | 138.70 | 126.13 | 93.68 | 25.73 |
| 185 | 99.78 | 47.24 | 30.84 | 34.72 |

FIG. 9 shows there was no significant improvement in the surface quality of the workpiece when MAF was performed with the 12 μm cBN and 0.3 wt % EGN. The negative sign in the percent change, as shown in Table 5, indicated the deterioration of the surface quality with the addition of EGN in the brush. In contrast, the positive percent change in surface quality with the three larger abrasive particles indicated the improved surface quality with the addition of EGN. It was also observed that the percent change in the roughness value with the addition of EGN was proportional to the abrasive size. These results demonstrate that the impact of EGN on MAF performance can vary depending on the abrasive size.

Discussion of Results

The number of abrasive particles in the slurry mixture of the brush compositions used in Examples 1-3 was determined. The results from these calculations are shown in Table 6, below, where SA represents total surface area of the abrasive particles, N represents number of abrasive particles in the brush, and $SA_{rel}$ and $N_{rel}$ represent the relative surface area and number of EGN particles with respect to that of the abrasive particle, respectively. Each of $SA_{rel}$ and $N_{rel}$ are determined by dividing their respective surface areas and number of particles in the brush. For the given total mass of the brush (2.8 g), the numbers of each particles were calculated for each particle size.

TABLE 6

Comparison of Various Sized Abrasives with respect to EGN

| Mean Abrasive Material Diameter, D (μm) | N (× $10^6$) | SA ($m^2$) | $SA_{rel}$ | $N_{rel}$ |
|---|---|---|---|---|
| 12 | 256 | 0.116 | 9.44 | 108 |
| 35 | 10.3 | 0.0397 | 27.5 | 2680 |
| 44 | 5.19 | 0.0316 | 34.5 | 5340 |
| 68 | 1.40 | 0.0204 | 53.4 | 19,700 |
| 90 | 0.607 | 0.0154 | 70.7 | 45,700 |
| 185 | 0.0699 | 0.00750 | 145 | 397,000 |
| M5 xGnP | 27,700 | 1.09 | | |

As shown in Table 6, the total surface area of smaller abrasives is a few orders of magnitude higher than that of larger abrasives. The total surface area of the abrasive particles are calculated to be 0.116 $m^2$ for 12 μm cBNs, and only 0.0075 $m^2$ for 185 μm particles. With 0.3 wt % EGN, the total surface area of EGN based on its average diameter and thickness (see Table 1) is calculated to be 1.09 $m^2$, which is independent of the abrasive size. The relationship between the abrasive size and relative surface area coverage ($SA_{rel}$), which is inversely proportional to the total surface area of abrasives (the surface area of each abrasive particles times the total number of abrasive particles in the brush), was found to be linearly proportional. As the abrasive size increased, the relative surface area covered by EGN increased by the same factor, as the same grade and quantity of EGN were used in all of the runs. Hence, $SA_{rel}$ as presented in Table 6 was significantly higher for the larger cBN particles. The higher relative surface area of EGN with respect to the abrasive particles demonstrated that the surface covered by the EGN was significantly higher for the larger abrasive particles. Thus, the EGN were expected to be adequately distributed on the abrasive particles to reduce the inter-collision between the abrasives and iron particles, and to reduce the intra-collision for the larger abrasive particles, which helped to maintain the sharp cutting edges. More generally, this illustrates that the relative amounts and/or sizes of the abrasive and solid lubricant (e.g., in the form of nanoplatelets) can be selected to improve the useful life of the abrasive particles, for example by coating/covering at least a portion of the abrasive particles with solid lubricant and by reducing collisions particle-abrasive collisions.

Similarly, the relative number of EGN per abrasive particle ($N_{rel}$) demonstrates the number of EGNs covering a single abrasive particle. Notably, not all EGNs in the composition may be in contact with the abrasive particles, as the brush also contains silicone oil and iron particles. However, with the consistent weight fraction of each brush constituent and the same iron particle size in all cases, the reasonably relationship among these parameters was derived. As shown in Table 6, the relative number of EGNs per abrasive particle increased proportionally in relation to the abrasive size. Table 6 demonstrates that the relative number of EGNs per abrasive particle among the various abrasive particles used can differ by up to three orders of magnitude. Without intending to be bound by theory, even though the higher number of EGNs were expected to be engaged with the larger abrasive particles compared to the smaller ones, the difference in number implied that EGNs were more effectively engaged for better protection against wear when larger abrasive particles were used in the brush composition.

Figure 10A:
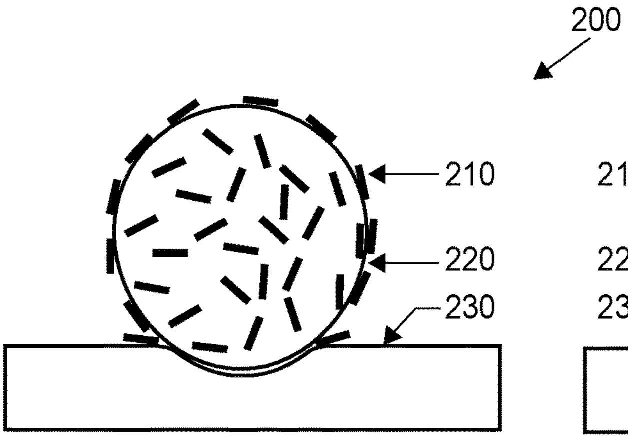
FIG. 10A is a schematic of the relative arrangement of solid lubricants with abrasive particles having a larger mean diameter.
Figure 10B:
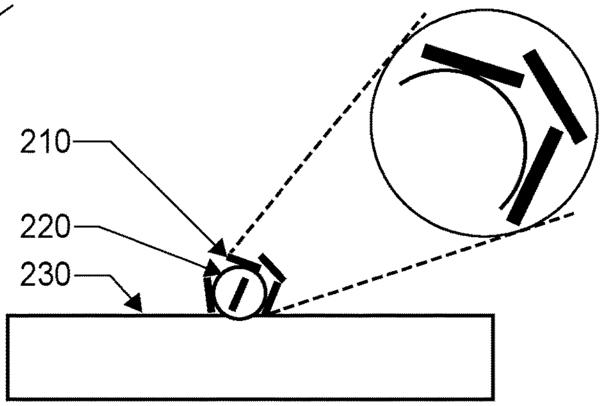
FIG. 10B is a schematic of the relative arrangement of solid lubricants with abrasive particles having a smaller mean diameter.

A schematic representation 200 of EGNs relative to the abrasive size is provided in FIGS. 10A and 10B. The relative size of the EGNs 210 on the surface of the individual abrasive particles 220 was also considered for the workpiece 230. The M5 grade of EGNs used in Examples 1-3 have a diameter of about 5 μm and a thickness of about 6-8 μm (see Table 1). Each EGN, due to its high stiffness (1000 MPa in plane) and the diameter, could not protect the 12 μm cBNs, and the size of the EGNs being relatively close to the cBN size deterred the other EGNs to be in contact with the abrasive particle as shown in FIG. 10B. However, with the larger abrasive particles, offered by the larger surface area of individual particles, many EGNs can cover the surface of the abrasive, as shown in FIG. 10A. Without intending to be bound by theory, this can allow better surface coverage, which will provide the effective protection for the larger abrasive particles.

The normal force acting on each abrasive particle during the MAF process and its impact on material removal were also considered. For larger abrasive particles, the normal force on each abrasive particle and the resulting indentation depth were found to be significantly higher. In contrast, smaller abrasive particles experience much smaller normal force on each abrasive particle, resulting in smaller indentation depth and less material removal. At the same time, the larger abrasive particles can be more difficult to maneuver around the iron particles of the brush, causing two-body abrasion compared to the smaller abrasives, which can more easily maneuver against the iron particles, causing three-body abrasion. The number of active abrasive particles was calculated using the ratio between the total number of particles and the number of layers, which can be estimated by dividing the working gap between the magnet and the workpiece with the respective abrasive diameters. The number of layers, L, and the number of active abrasive particles, $N_{act}$, are provided in Table 7, below.

TABLE 7

Features of Abrasive Particles Depending on Size

| Mean Abrasive Material Diameter, D (μm) | Number of Layers, L | Number of Active Abrasives, $N_{act}$ ($\times 10^4$) | Normal Force per Active Abrasive, $f_N$ (N) ($\times 10^{-5}$) | Indentation depth, d (nm) | Hertzian contact radius, a (nm) |
|---|---|---|---|---|---|
| 12 | 167 | 153 | 0.138 | 0.18 | 33.40 |
| 35 | 57 | 18.0 | 1.17 | 0.54 | 97.42 |
| 44 | 45 | 11.4 | 1.86 | 0.68 | 122.47 |
| 68 | 29 | 4.78 | 4.44 | 1.05 | 189.28 |
| 90 | 22 | 2.73 | 7.79 | 1.39 | 250.52 |
| 185 | 11 | 0.646 | 32.9 | 2.86 | 514.95 |

The inversely proportional relationship between the normal force acting on each abrasive particle and the number of active abrasive particles, as shown in Table 7, indicated that the normal force acting on each abrasive particle was much higher for larger abrasive particles. As shown in Table 7, the number of active abrasive particles for 12 μm abrasives was nearly 238 times higher than the number of active abrasive particles for 185 μm abrasives. This resulted in the normal force on each 185 μm abrasive particle to be 238 times higher than that of each 12 μm abrasive.

The indentation diameter caused by one abrasive particle against the workpiece was directly proportional to the normal force acting on each abrasive particle, as shown in Table 7. Both the total and active number of abrasive particles were significantly lower for larger abrasive particles, resulting in a higher normal force per abrasive particle. The indentation depth and effective contact area by each abrasive particle during the MAF process were estimated using Hertzian contact theory, the results of which are shown in Table 7.

The material removal mechanism in MAF can depend significantly on the indentation depth of each abrasive particle in the workpiece. Thus, the higher normal force acting on a larger abrasive causes the larger indentation depth (Table 7), which increases the material removal rate (MRR). Meanwhile, the lower normal force on the smaller abrasives implies the reduction in indentation depth and MRR on the workpiece. Within the brush, the smaller abrasives are less constrained compared to larger abrasives due to lower normal force, which involve the relative motion of the abrasives mimicking three-body abrasion. The two-body abrasion process had been reported to have abrasive wear up to three times higher than that of the three-body abrasion because of longer cutting time with higher cutting depth. From the calculated indentation depth, shown in Table 7, the indentation depth of 185 μm abrasive particles was nearly 16 times larger than that of 12 μm abrasive particles. This demonstrated that the larger abrasives were engaged with a more aggressive cutting mechanism than the smaller abrasives.

Examples 1-3 demonstrate that the presence of EGNs can advantageously preserve the sharp edges of abrasive particles, despite more aggressive cutting with larger abrasive particles in the brush. As the EGNs help to preserve the cutting edges of the abrasive particles, the processing time can be extended with larger abrasive particles, while the MAF performance is enhanced. This significant improvement was not observed with the smaller abrasive particles, which resulted in milder MRR, while not preserving the cutting edges of the abrasive particles. Moreover, larger abrasive particles and a higher magnetic flux density provided a stiffer brush, which enhanced the cutting performance by increasing MRRs.

Example 4—High-Viscosity Brush Compositions

Table 8, below, provides representative brush compositions having relatively high viscosity values, including compositions with comparatively higher or lower total solids loading. The brush compositions are particularly suitable for high-speed polishing operations, in particular at relatively high rotation rates for the spindle, magnet, and brush. The carrier fluid has a kinematic viscosity at 25° C. of about 1,000,000 cSt and can be a silicone oil. The solid lubricant (when present) can be EGNs. The abrasive particles can be silicon carbide (SiC) of a suitable size (e.g., 1500 grit). The magnetic particles can be magnetic iron particles of a suitable size.

TABLE 8

High-Viscosity Brush Compositions

| Component | Sample A | Sample B | Sample C |
|---|---|---|---|
| Carrier Fluid (1MM cSt) | 17.7 wt. % | 17.4 wt. % | 42.7 wt. % |
| Solid Lubricant | 0 wt. % | 0.9 wt. % | 0.3 wt. % |
| Abrasive Particles | 41.2 wt. % | 40.9 wt. % | 28.5 wt. % |
| Magnetic Particles | 41.1 wt. % | 40.8 wt. % | 28.5 wt. % |
| Abrasive:Magnetic Ratio | 1:1 (w/w) | 1:1 (w/w) | 1:1 (w/w) |
| Abrasive + Magnetic: Carrier Ratio | 4.64:1 (w/w) | 4.69:1 (w/w) | 1.33:1 (w/w) |

Because other modifications and changes varied to fit particular operating requirements and environments will be apparent to those skilled in the art, the disclosure is not considered limited to the example chosen for purposes of illustration, and covers all changes and modifications which do not constitute departures from the true spirit and scope of this disclosure.

Accordingly, the foregoing description is given for clearness of understanding only, and no unnecessary limitations should be understood therefrom, as modifications within the scope of the disclosure may be apparent to those having ordinary skill in the art.

All patents, patent applications, government publications, government regulations, and literature references cited in this specification are hereby incorporated herein by reference in their entirety. In case of conflict, the present description, including definitions, will control.

Throughout the specification, where the articles, compositions, processes, kits, or apparatus are described as including components, steps, or materials, it is contemplated that the compositions, processes, or apparatus can also comprise, consist essentially of, or consist of, any combination of the recited components or materials, unless described otherwise. Component concentrations can be expressed in terms of weight concentrations, unless specifically indicated otherwise. Combinations of components are contemplated to include homogeneous and/or heterogeneous mixtures, as would be understood by a person of ordinary skill in the art in view of the foregoing disclosure.

What is claimed is:

1. A brush composition for magnetic field-assisted finishing, the brush composition comprising:

a carrier fluid;

solid lubricant nanoplatelets dispersed in the carrier fluid, wherein:

the solid lubricant nanoplatelets comprise exfoliated graphite nanoplatelets (EGN), and the solid lubricant nanoplatelets have an average thickness ($T_{SL}$) in a range of 0.3 nm to 20 nm;

abrasive particles dispersed in the carrier fluid; and magnetic particles dispersed in the carrier fluid.

2. The brush composition of claim 1, wherein:

the carrier fluid has a kinematic viscosity in a range of about 1,000 centistokes to about 100,000 centistokes.

3. The brush composition of claim 1, wherein the carrier fluid comprises an oil.

4. The brush composition of claim 1, wherein the carrier fluid is present in the brush composition in an amount in a range from 30 wt. % to 80 wt. % based on the brush composition.

5. The brush composition of claim 1, wherein the carrier fluid has a kinematic viscosity in a range of about 3,000 centistokes to about 10,000 centistokes.

6. The brush composition of claim 1, wherein the solid lubricant nanoplatelets have:

an average diameter ($D_{SL}$) in a range of 0.1 μm to 500 μm; and an aspect ratio ($D_{SL}/T_{SL}$) in a range of 100 to 10000.

7. The brush composition of claim 1, wherein the solid lubricant nanoplatelets have a specific surface area in a range of 25 $m^2/g$ to 500 $m^2/g$.

8. The brush composition of claim 1, wherein the solid lubricant nanoplatelets are present in the brush composition in an amount in a range from 0.01 wt. % to 5 wt. % based on the brush composition.

9. The brush composition of claim 1, wherein the abrasive particles are selected from the group consisting of diamond dust, pumice, iron (III) oxide, iron particles, steel, sand, corundum, garnet, sandstone, tripoli (rotten stone), powdered feldspar, staurolite, cubic boron nitride (cBN), ceramics, glass powder, silicon nitride, silicon carbide (carborundum), boron nitrides, zirconia, alumina, boron carbide slags, and combinations or mixtures thereof.

10. The brush composition of claim 1, wherein the abrasive particles have an average diameter ($D_{AP}$) in a range of 5 μm to 500 μm.

11. The brush composition of claim 1, wherein the abrasive particles are present in the brush composition in an amount in a range from 10 wt. % to 50 wt. % based on the brush composition.

12. The brush composition of claim 1, wherein a ratio of an average diameter of the abrasive particles ($D_{AP}$) to an average diameter of the solid lubricant nanoplatelets ($D_{SL}$) is at least 5.

13. The brush composition of claim 1, wherein a ratio of the number of the solid lubricant nanoplatelets ($N_{SL}$) to the number of the abrasive particles ($N_{AP}$) is at least 500.

14. The brush composition of claim 1, wherein a ratio of the surface area of the solid lubricant nanoplatelets ($SA_{SL}$) to the surface area of the abrasive particles ($SA_{AP}$) is at least 20.

15. The brush composition of claim 1, wherein the magnetic particles comprise ferromagnetic iron particles.

16. The brush composition of claim 1, wherein the magnetic particles have an average diameter ($D_{MP}$) in a range of 5 μm to 500 μm.

17. The brush composition of claim 1, wherein the magnetic particles are present in the brush composition in an amount in a range from 10 wt. % to 50 wt. % based on the brush composition.

18. The brush composition of claim 1, wherein comprising one or more additives selected from the group consisting of biocides, viscosity-control agents, wetting agents, film-forming agents, antifoam agents, and/or corrosion inhibitors.

19. The brush composition of claim 1, wherein the carrier fluid has a kinematic viscosity in a range of about 500,000 centistokes to about 1,200,000 centistokes.

20. The brush composition of claim 1, wherein:

the carrier fluid is present in the brush composition in an amount in a range from 30 wt. % to 80 wt. % based on the brush composition;

the abrasive particles are present in the brush composition in an amount in a range from 10 wt. % to 50 wt. % based on the brush composition; and the magnetic particles are present in the brush composition in an amount in a range from 10 wt. % to 50 wt. % based on the brush composition.

21. The brush composition of claim 1, wherein:

the carrier fluid is present in the brush composition in an amount in a range from 10 wt. % to 80 wt. % based on the brush composition;

the abrasive particles are present in the brush composition in an amount in a range from 10 wt. % to 60 wt. % based on the brush composition; and the magnetic particles are present in the brush composition in an amount in a range from 10 wt. % to 60 wt. % based on the brush composition.

22. The brush composition of claim 1, wherein:

the carrier fluid is present in the brush composition in an amount in a range from 10 wt. % to 50 wt. % based on the brush composition;

the abrasive particles are present in the brush composition in an amount in a range from 25 wt. % to 60 wt. % based on the brush composition; and the magnetic particles are present in the brush composition in an amount in a range from 25 wt. % to 60 wt. % based on the brush composition.

23. The brush composition of claim 1, wherein a weight ratio of abrasive particles:magnetic particles present in the brush composition is in a range of 3:1 to 1:3.

24. The brush composition of claim 1, wherein a weight ratio of combined abrasive particles and magnetic particles: carrier fluid present in the brush composition is in a range of 8:1 to 1:4.

25. The brush composition of claim 1, wherein:

the solid lubricant nanoplatelets have: an average diameter ($D_{SL}$) in a range of 0.1 μm to 500 μm, an aspect ratio ($D_{SL}/T_{SL}$) in a range of 100 to 10000, and a specific surface area in a range of 25 $m^2/g$ to 500 $m^2/g$;

a ratio of an average diameter of the abrasive particles ($D_{AP}$) to an average diameter of the solid lubricant nanoplatelets ($D_{SL}$) is at least 5;

a ratio of the number of the solid lubricant nanoplatelets ($N_{SL}$) to the number of the abrasive particles ($N_{AP}$) is at least 500; and a ratio of the surface area of the solid lubricant nanoplatelets ($SA_{SL}$) to the surface area of the abrasive particles ($SA_{AP}$) is at least 20.

26. The brush composition of claim 25, wherein:

the carrier fluid is present in the brush composition in an amount in a range from 10 wt. % to 80 wt. % based on the brush composition;

the solid lubricant nanoplatelets are present in the brush composition in an amount in a range from 0.01 wt. % to 5 wt. % based on the brush composition;

the abrasive particles are present in the brush composition in an amount in a range from 10 wt. % to 60 wt. % based on the brush composition; and the magnetic particles are present in the brush composition in an amount in a range from 10 wt. % to 60 wt. % based on the brush composition.

27. The brush composition of claim 26, wherein:

the carrier fluid comprises an oil;

the abrasive particles are selected from the group consisting of diamond dust, pumice, iron (III) oxide, iron particles, steel, sand, corundum, garnet, sandstone, tripoli (rotten stone), powdered feldspar, staurolite, cubic boron nitride (cBN), ceramics, glass powder, silicon nitride, silicon carbide (carborundum), boron nitrides, zirconia, alumina, boron carbide slags, and combinations or mixtures thereof; and the magnetic particles comprise ferromagnetic iron particles.

28. The brush composition of claim 27, wherein:

the abrasive particles have an average diameter ($D_{AP}$) in a range of 5 μm to 500 μm;

the magnetic particles have an average diameter ($D_{MP}$) in a range of 5 μm to 500 μm;

a weight ratio of abrasive particles:magnetic particles present in the brush composition is in a range of 3:1 to 1:3; and a weight ratio of combined abrasive particles and magnetic particles:carrier fluid present in the brush composition is in a range of 8:1 to 1:4.

29. A brush composition for magnetic field-assisted finishing, the brush composition comprising:

a carrier fluid;

solid lubricant nanoplatelets dispersed in the carrier fluid, wherein:

the solid lubricant nanoplatelets comprise a material selected from the group consisting of graphite, hexagonal boron nitride, molybdenum disulfide, tungsten disulfide, and combinations or mixtures thereof, the solid lubricant nanoplatelets have an average diameter ($D_{SL}$) in a range of 0.1 μm to 500 μm, the solid lubricant nanoplatelets have an average thickness ($T_{SL}$) in a range of 0.3 nm to 20 nm, and the solid lubricant nanoplatelets have an aspect ratio ($D_{SL}/T_{SL}$) in a range of 100 to 10000;

abrasive particles dispersed in the carrier fluid; and magnetic particles dispersed in the carrier fluid.

30. A syringe delivery system comprising:

a syringe body defining an interior volume and an outlet orifice;

the brush composition of claim 1 contained within the interior volume of the syringe body; and a plunger means for expelling the brush composition from the interior volume of the syringe body via the outlet orifice of the syringe body.

31. A method for finishing a surface of a workpiece, the method comprising:

providing a tool comprising a rotatable magnetic head;

applying and holding in place the brush composition of claim 1 at a surface of the rotatable magnetic head;

contacting a surface of a workpiece with the brush composition while rotating the magnetic head of the tool, thereby finishing the surface of the workpiece.

32. The method of claim 31, wherein the rotatable magnetic head comprises at least one of an electromagnet and a permanent magnet.

33. The method of claim 31, wherein, after finishing the surface of the workpiece, the surface of the workpiece has a surface roughness (Ra) value of less than about 100 nm.

34. The method of claim 31, wherein the surface of the workpiece is a three-dimensional (3D) freeform surface.

35. A system for magnetic-field assisted finishing, the system comprising:

a tool comprising a rotatable magnetic head; and the brush composition according to claim 1.

* * * * *